(12) United States Patent
Sweatt et al.

(10) Patent No.: US 7,187,815 B1
(45) Date of Patent: Mar. 6, 2007

(54) RELAYING AN OPTICAL WAVEFRONT

(75) Inventors: William C. Sweatt, Albuquerque, NM (US); G. Allen Vawter, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 272 days.

(21) Appl. No.: 10/956,733

(22) Filed: Oct. 1, 2004

(51) Int. Cl.
  *G02B 6/00* (2006.01)
(52) U.S. Cl. ..................... 385/12; 250/201.9
(58) Field of Classification Search ............... 356/121; 385/3, 16, 42
  See application file for complete search history.

(56) References Cited

U.S. PATENT DOCUMENTS

| | | | | |
|---|---|---|---|---|
| 4,798,437 A * | 1/1989 | Rediker et al. ............... 385/3 |
| 5,493,391 A * | 2/1996 | Neal et al. .................. 356/121 |
| 5,912,731 A * | 6/1999 | DeLong et al. ............. 356/121 |
| 5,926,589 A * | 7/1999 | Gaeta ........................... 385/16 |
| 6,184,974 B1 * | 2/2001 | Neal et al. .................. 356/121 |
| 6,785,447 B2 * | 8/2004 | Yoshimura et al. ........... 385/42 |

\* cited by examiner

*Primary Examiner*—Frank G. Font
*Assistant Examiner*—Guy G. Anderson
(74) *Attorney, Agent, or Firm*—Fenwick & West LLP; Kevin W. Bieg

(57) ABSTRACT

A wavefront rely devices samples an incoming optical wavefront at different locations, optically relays the samples while maintaining the relative position of the samples and the relative phase between the samples. The wavefront is reconstructed due to interference of the samples. Devices can be designed for many different wavelengths, including for example the ultraviolet, visible, infrared and even longer wavelengths such as millimeter waves. In one application, the device function as a telescope but with negligible length.

60 Claims, 14 Drawing Sheets

System/Prescription Data

| Surf | Type | Comment | Radius | Thickness | Glass | Diameter |
|---|---|---|---|---|---|---|
| OBJ | STANDARD | | Infinity | Infinity | | 0 |
| STO | EVENASPH | | Infinity | 0 | | 3.619464 |
| 2 | STANDARD | | Infinity | 1.871277 | GAAS | 3.619574 |
| 3 | STANDARD | | -40.15953 | 2 | SILICON | 5.305777 |
| 4 | STANDARD | | -7.690542 | 3.6 | | 5.839923 |
| 5 | STANDARD | | -4.791744 | 0.6 | LIF | 2.155744 |
| 6 | STANDARD | | Infinity | 0.06 | | 1.788506 |
| IMA | STANDARD | | Infinity | | | 1.764447 |

SURFACE DATA DETAIL

Assume focus and spherical aberration built into waveguide array

Surface STO : EVENASPH

Coeff on r 2 : -0.0036812032

Coeff on r 4 : -0.001 7568513

Coeff on r 6 : -0.00034966385

Wavelengths, 3, 4, and 5 microns

FOV = ±2.7 degrees

FIG. 9B

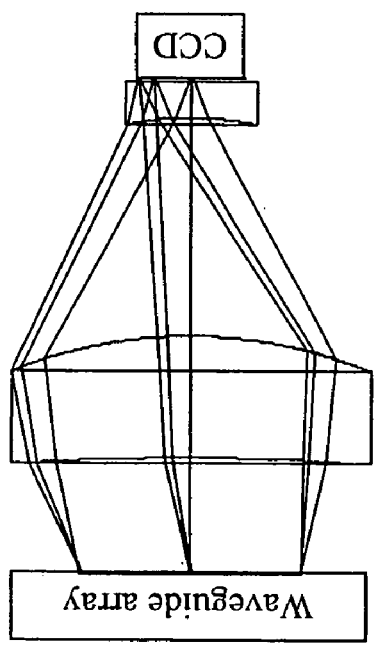

FIG. 9A

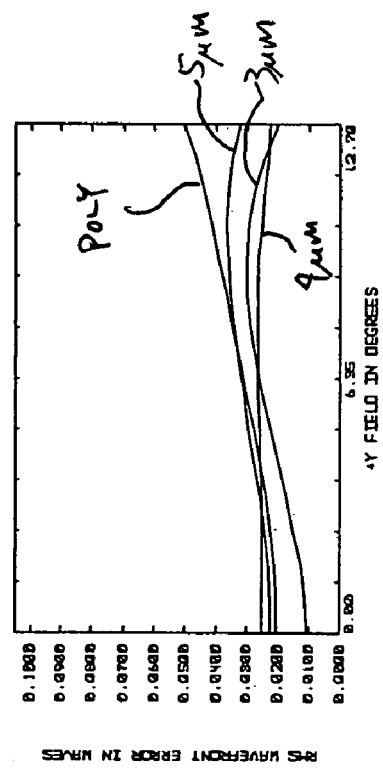

FIG. 9C

RELAYING AN OPTICAL WAVEFRONT

GOVERNMENT RIGHTS LEGEND

This invention was developed under Contract DE-AC04-94AL85000 between Sandia Corporation and the U.S. Department of Energy. The U.S. Government has certain rights in this invention.

BACKGROUND OF THE INVENTION

1. Field of the Invention

This invention relates generally to the manipulation of optical wavefronts. More particularly, this invention relates to optically relaying an optical wavefront in pieces.

2. Description of the Related Art

Wavefront manipulation is a basic function in optics. Many conventional optical elements are designed to manipulate optical wavefronts in different ways. For example, lenses focus/defocus wavefronts and can introduce or remove higher order perturbations in the wavefront (e.g., aberrations), mirrors reflect wavefronts, prisms change the direction of propagation of wavefronts, and devices such as beam splitters and dichroic elements can be used to multiplex/demultiplex wavefronts. Imaging is a basic optical function that depends heavily on wavefront manipulation. An imaging system receives an incoming optical wavefront and largely converts phase variations in the wavefront to intensity variations that are similar to the original source producing the wavefront (i.e., similar to the object).

However, wavefront manipulation usually requires space, as it is the propagation of the manipulated wavefront over space that typically results in the intended effect. For example, for a 50 mm diameter, F/1 imaging system, the image is not visible immediately after the imaging lens. Rather, the wavefront must propagate over the focal length (or on the order of about 50 mm) in order to form the image. As a result, the imaging system typically is more than 50 mm thick.

Thus, there is a need for devices that can manipulate and/or relay optical wavefronts but in a more compact manner. For example, it would be desirable to design a 50 mm diameter, F/1 imaging system that was significantly thinner than 50 mm.

SUMMARY OF THE INVENTION

The present invention overcomes the limitations of the prior art by sampling an incoming optical wavefront at different positions within an aperture and optically relaying the samples while maintaining the relative positions of the samples with respect to each other and while also maintaining the relative phase relationship between the samples. The wavefront is then reconstructed due to interference of the relayed samples.

In one aspect of the invention, a device for relaying an incoming optical wavefront includes an input aperture, an output aperture and a wavefront relay. The input aperture includes a plurality of input subapertures. The output aperture also includes a plurality of output subapertures, which correspond to the input subapertures. Each output subaperture is located in the same relative position within the output aperture as the corresponding input subaperture is located within the input aperture. The wavefront relay includes a plurality of optical pathways that optically couple the input subapertures to their corresponding output subapertures.

The input subapertures sample the incoming wavefront at different locations within the input aperture. The optical pathways optically relay the sampled wavefront from the input subapertures to the corresponding output subapertures, while substantially maintaining a relative phase of the wavefront between subapertures. Propagation of the relayed wavefronts from the output subapertures then reconstructs the wavefront.

In another aspect of the invention, a flat imager uses such a device to reduce the size of the incoming wavefront, as an afocal telescope would. The reduced size wavefront is then imaged using a correspondingly smaller imager. For example, a 50 mm diameter input aperture may be reduced to a 5 mm diameter output aperture in the space of less than 10 mm. The 5 mm wavefront is then imaged using a 10× smaller imaging system. Thus, a significantly thinner 50 mm diameter imaging system can be constructed. One embodiment captures an image as does a Cassegrain telescope but is dramatically shorter than the typical Cassegrain.

In one specific design, rectangular waveguides are used to relay the wavefront from input aperture to output aperture. Microlenses located in the input subapertures couple different parts of the incoming wavefront into the entrances of different waveguides. The exits of the waveguides are located approximately around the corresponding output subaperture. Thus, the waveguides route the wavefront from input subapertures to the corresponding output subapertures. The waveguides are integrated on a substrate(s). The entire device is fairly thin since the input aperture, the output aperture and the substrate(s) with integrated waveguides are each thin and they are approximately positioned on a common plane. In one approach, all of the waveguides have approximately the same optical path length. Since the straight line distance from each input subaperture to the corresponding output subaperture, the constant optical path length can be achieved by designing the waveguides with "trombone" sections that vary in length.

Other aspects of the invention include additional implementations of wavefront relays, additional applications of wavefront relays, methods corresponding to the devices and systems described above, and methods for fabricating and operating these devices and systems. These devices and systems can be designed for many different wavelengths, including for example the ultraviolet, visible, infrared and even longer wavelengths such as millimeter waves.

BRIEF DESCRIPTION OF THE DRAWINGS

The invention has other advantages and features which will be more readily apparent from the following detailed description of the invention and the appended claims, when taken in conjunction with the accompanying drawings, in which:

FIGS. 9A–9C are diagrams of a focusing lens.

DETAILED DESCRIPTION OF THE PREFERRED EMBODIMENTS

Figure 1A:
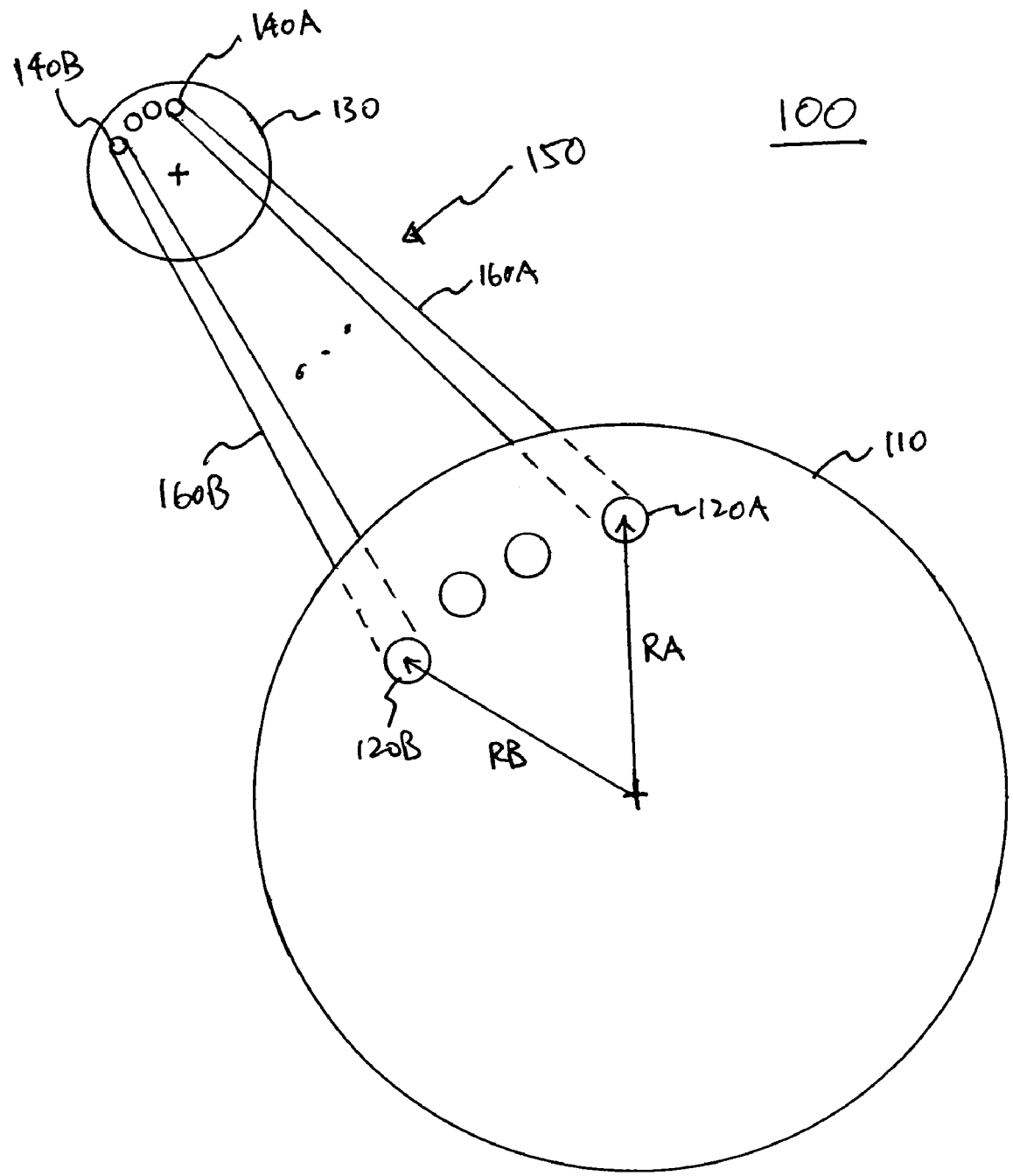
FIGS. 1A–1C are diagrams of devices according to the present invention.

FIG. 1A is a perspective view of a device 100 according to the present invention. The device has an input aperture 110 and an output aperture 130. Each aperture is subdivided into subapertures, which shall be referred to as input subapertures 120 and output subapertures 140. For clarity, only a few subapertures are shown. The output subapertures 140 correspond to the input subapertures 120 and are located in a same relative position within the output aperture 140 as the corresponding input subaperture is located within the input aperture 110. For example, in FIG. 1, output aperture 120 is smaller than input aperture 110 by a scale factor 1/S. Using radial coordinates, input subaperture 120A is located approximately at the 12:00 position at a radius RA and corresponding output subaperture 140A is located approximately at the 12:00 position but at a radius RA/S. Similarly, input subaperture 120B is located approximately at the 10:00 position at a radius RB and corresponding output subaperture 140B is located approximately at the 10:00 position but at a radius RB/S.

Figure 1B:
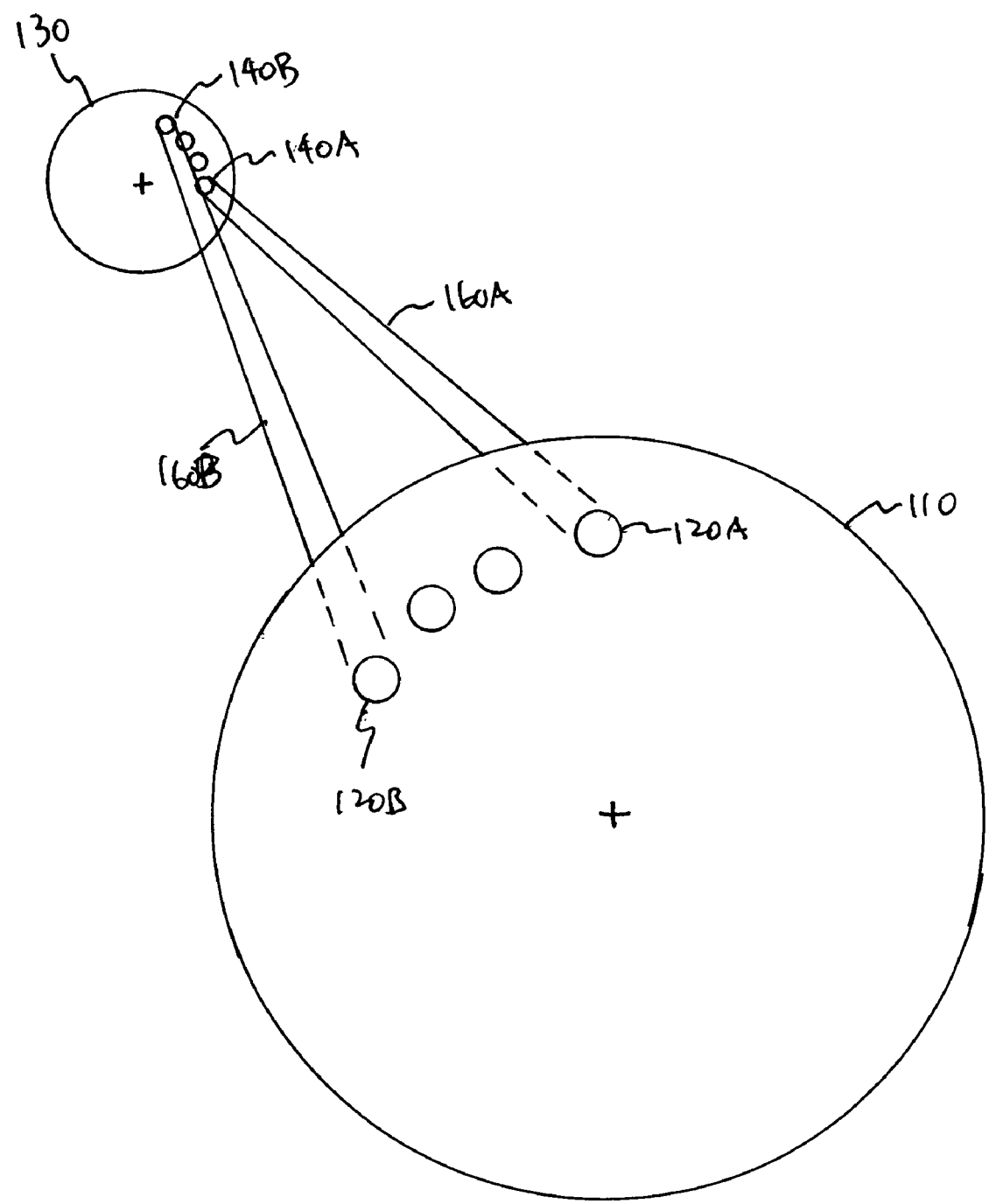
Figure 1C:
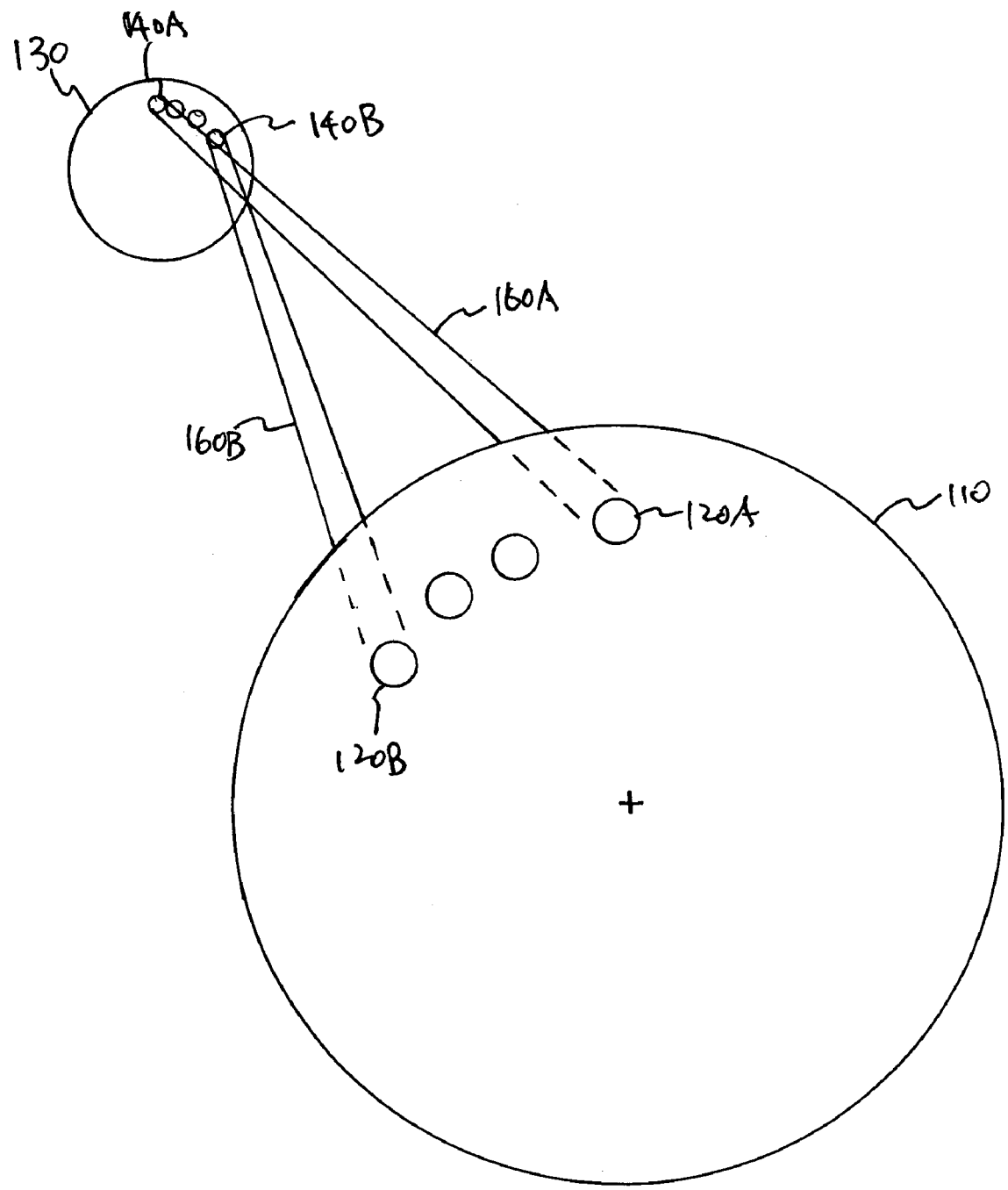

Although the input and output subapertures 120 and 140 are located in the same relative position, they are not required to be the same shape nor are they required to occupy the same absolute position. For example, FIG. 1B shows a device where the output aperture 130 is rotated 90 degrees clockwise with respect to the input aperture 110. Thus, input subaperture 120A is located at 12:00 but corresponding output subaperture 140A is located at 3:00 (but still at radius RA/S). FIG. 1C shows a device where the output aperture 130 is a mirror image of the input aperture 110. Here, output subaperture 140A is located at 12:00, but output subaperture 140B is located at 2:00 while the corresponding input subaperture 120B is located at 10:00.

The subapertures can also be arranged in different ways. In some implementations, the subapertures may form a regular pattern. For example, hexagonal or rectangular (including square) patterns may be used if a high fill factor is desired. Irregular patterns may be used in applications where artifacts caused by regular patterns are undesirable.

Returning to FIG. 1A, the device 100 also includes a wavefront relay 150. The relay 150 contains optical pathways 160 that optically couple the input subapertures 120 to the corresponding output subapertures 140, while substantially maintaining the relative phase relationship of the wavefront at the subapertures. In FIG. 1A, optical pathway 160A couples light from input subaperture 120A to output subaperture 140A, pathway 160B couples input subaperture 120B to output subaperture 140B, and so on.

Figure 2:
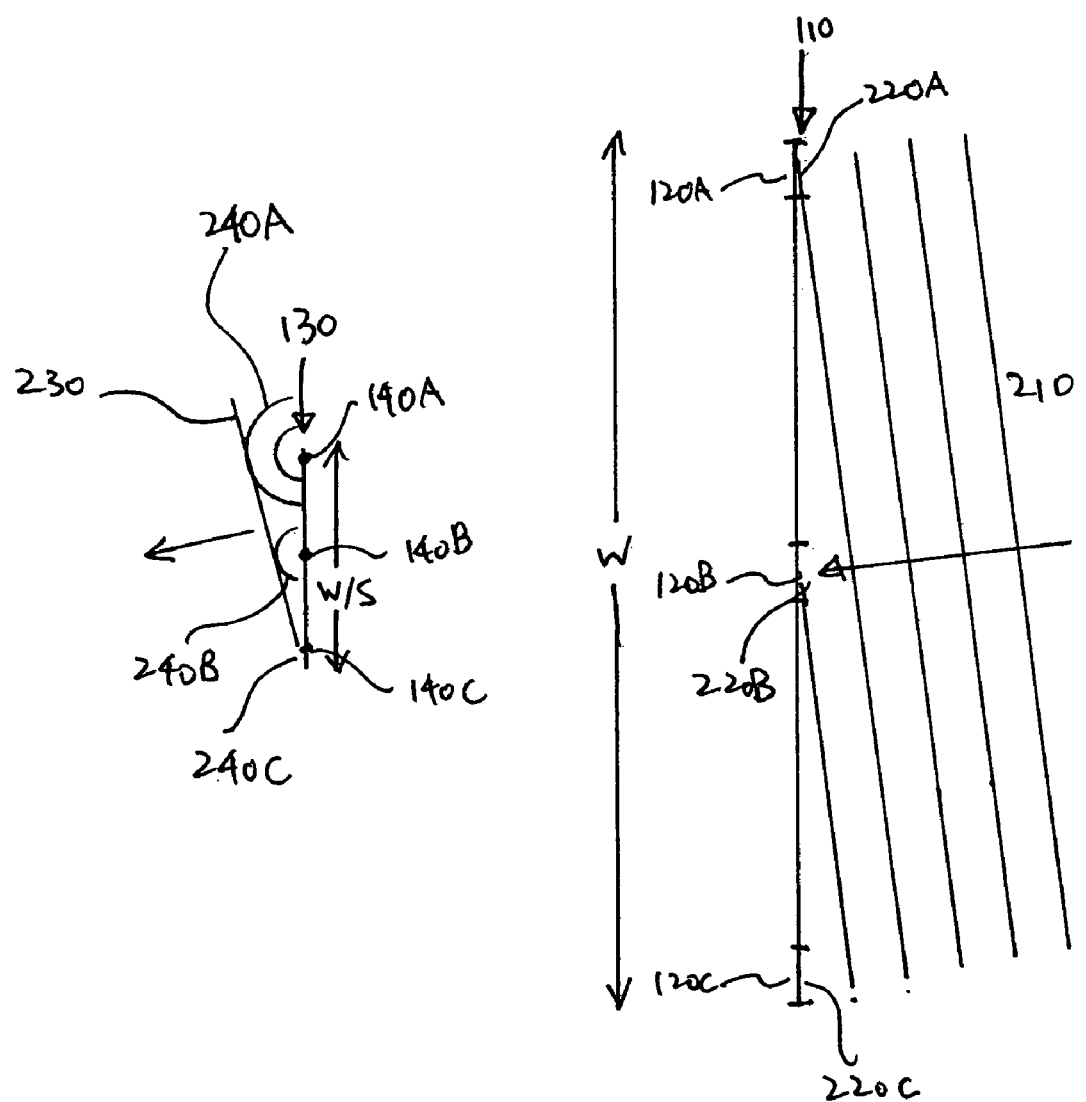
FIG. 2 is a side view illustrating operation of the device of FIG. 1A.

FIG. 2 illustrates operation of the device. An optical wavefront 210 is incident upon the input aperture 110. A tilted plane wave is used in this example. Each line in the wavefront represents a one wave path difference, so this plane wave has a two wave path difference across the input aperture 110. The incoming wavefront 210 is sampled by the input subapertures 120. Wavefront region 220A is captured by input subaperture 120A, region 220B by subaperture 120B and region 220C by subaperture 120C. Note that region 220A is one wave ahead of region 220B, which is one wave ahead of region 220C. The samples are optically relayed by the wavefront relay (not shown for clarity) from the input subapertures 120 to the corresponding output subapertures 140, which in this case are apertures that are small enough to act as point emitters.

Since the wavefront relay preserves the relative phase of the different regions, the wavefront 240A emitted at output subaperture 140A is one wave ahead of the wavefront 240B emitted by subaperture 140B, which is one wave ahead of the wavefront 240C emitted by subaperture 140C. These interfere, resulting in an overall wavefront 230 that is a reconstruction of the incoming wavefront 210, although not necessarily an exact reconstruction. In this example, the outgoing wavefront 230 still has a two wavelength path difference across the output aperture 130 but the output aperture has a width W/S rather than width W (the width of the input aperture). Thus, the actual tilt of the wavefront has been increased by the scale factor S. In some sense, the device acts similarly to a Galilean telescope, with collimated input and output light but demagnifying the diameter of the beam by S.

The reconstructed wavefront 230 typically will not be an exact reconstruction of the incoming wavefront 210 for various reasons. The input subapertures 120 typically will not fully sample the entire input aperture 110. The input subapertures 120 may not sample the incoming wavefront 210 with enough resolution to reconstruction higher spatial frequency components in the wavefront. The output subapertures 140 may not form wavefront regions 240 that are full fidelity duplicates of the corresponding incoming regions 220. For example, in FIG. 1, incoming wavefront 210 is a plane wave over some finite area, but the corresponding outgoing wavefront 230 is a wavefront from an array of many point sources.

Figure 3A:
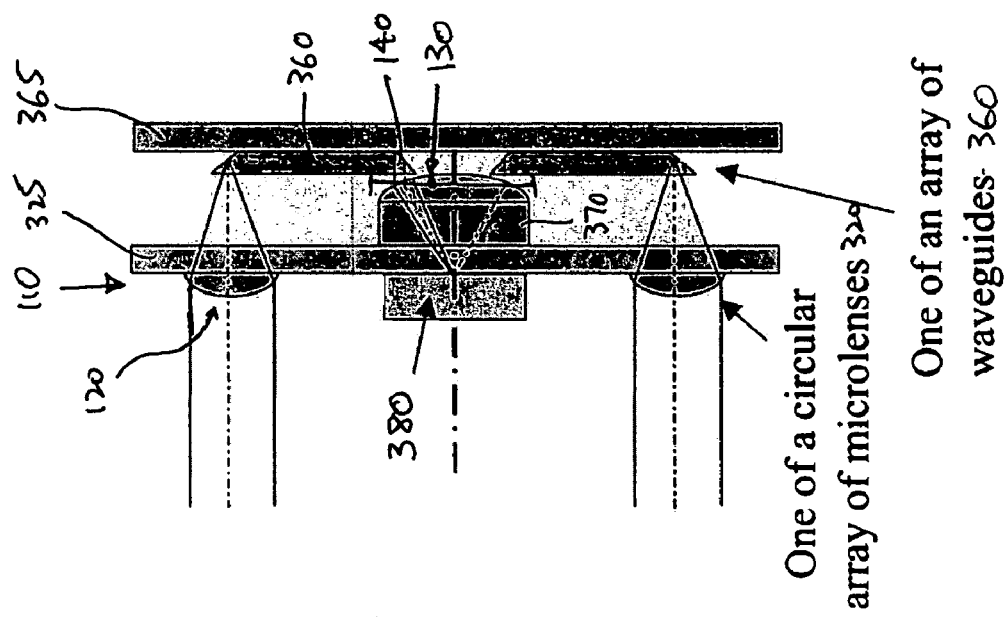
FIGS. 3A–3B are a side view and a front view of a flat imager according to the present invention.
Figure 3B:
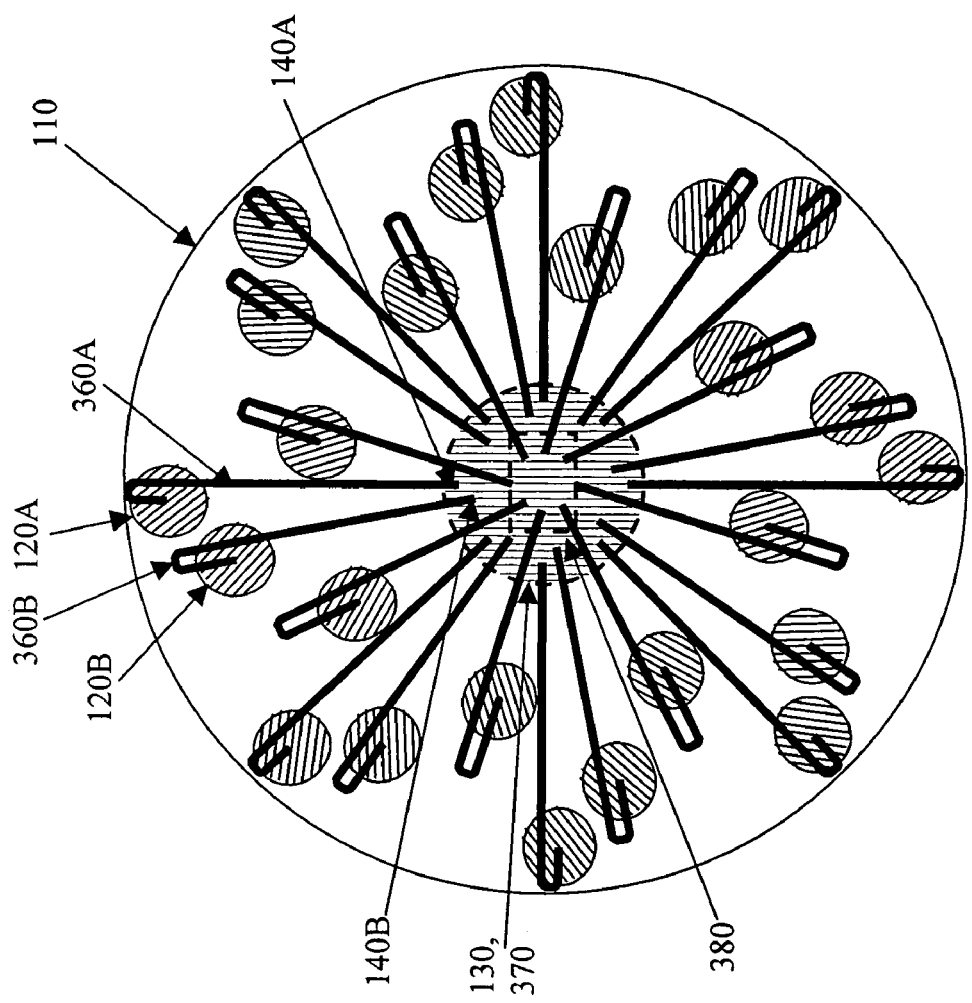

FIGS. 3A and 3B are a side view and a front view of a flat imager according to the present invention. FIG. 3B shows components from different parts of the device in order to explain the invention. All of these components may not be actually visible when viewing the device from the front. This flat imager is designed to image objects located at infinity and is intended for use in the infrared, specifically in the 3–5 μm infrared band. The effect of the wavefront relay portion of the flat imager can be modeled as a Cassegrain telescope with a mask that has a series of holes that are the same size, shape and location as the input subapertures.

The input aperture 110 is a 50 mm diameter circular aperture; the output aperture 130 is approximately 6 mm diameter so there is an 8:1 reduction in size. The input subapertures 120 are 0.1–0.5 mm diameter. With a fill factor of 50%, the subapertures can number into the thousands. Microlenses 320 are located in the input subapertures 120 to collect the incident wavefront. The microlenses 320 are focused onto the entrances of rectangular waveguides 360. The waveguides 360 transport the light to the output subapertures 140, which in this case are just the exits of the waveguides 360. The exits of the waveguides may or may not include microlenses. In one design, the numerical aperture of the waveguide (NA) is matched to the system magnification (1/S) and system field of view (FOV) by the relation FOV=NA*S and microlenses are not used. In this example, the waveguide NA is chosen to be approximately 0.3. The device also includes a focusing lens 370, which generates an image from the reconstructed wavefront, and an imaging detector 380, which captures the image.

The waveguides 360 are designed so they all have substantially the same optical path length. The optical path lengths need not be exactly the same. For example, intentional deviations may be introduced for various reasons, as will be described later. Since the straight line path from each input subaperture to the corresponding output subaperture varies, the waveguides include "trombone" sections that vary in length from one waveguide to the next. Waveguides that connect closer subapertures have longer trombone sections and those that connect farther subapertures have shorter trombone sections. In this way, the optical path length of the waveguides can be made the same.

The flat imager achieves a function that is similar to a conventional imager with a 50 mm aperture, but the flat imager is much thinner. This is because the incoming wavefront is optically relayed by the waveguides 360 (which are very thin) to the output aperture 140, but scaled down by a factor of 8:1. Hence, the focusing lens 370 and thermal imager 380 can also be reduced in size.

The field of view of the flat imager is determined in part by coupling by the microlens 320 into the waveguide 360. The microlens 320 produces an Airy pattern at its focus, with radius R=1.22 λ F/d where λ is the wavelength of the incoming light, and F and d are the focal length and diameter of the microlens (subaperture). The waveguide 360 preferably is a single mode waveguide. The cross-section of the waveguide 360 should be similar in dimension to the size of the Airy pattern in order to achieve good optical coupling into the waveguide. Now consider an off-axis image point. If the off-axis angle is equal to the Airy radius divided by the focal length, then approximately half of the power will fall onto the waveguide and half will miss the waveguide. Thus, this half power field of view limitation is given by $$\theta_{FOV} = R/F = 1.22\lambda/d \quad (1)$$

The resolution of the entire imager is not limited by the resolution of each microlens since the microlenses produce reconstructed wavefronts that combine coherently, analogous to phased array radar. As an upper limit, the resolution of the imager will approach the resolution set by the size of the input aperture 110, which is given by $$\Delta\theta = 2.44\lambda/D \quad (2)$$

where D is the diameter of the input aperture 110. The number of resolvable pixels across the pupil diameter can be estimated by $$2\theta_{FOV}/\Delta\theta = D/d \quad (3)$$

The factor of two accounts for the fact that the field of view ranges from $-\theta_{FOV}$ to $+\theta_{FOV}$.

For the system described above, the above estimates yield waveguides of approximately 2–6 μm in cross section, a field of view of approximately 1 degree, a resolution of approximately 0.005 degrees and approximately 200×200 resolvable pixels.

The signal to noise ratio generally increases as the number of input subapertures increases, assuming that the size of the input subapertures remain the same. Put in another way, assuming input subapertures of a certain size, the signal to noise ratio generally increases with the fill factor. The background noise signal scales linearly according to the number N of subapertures, but the signal scales according to $N^2$ since the wavefronts from the different subapertures are adding coherently. Thus, the overall signal to noise ratio generally increases according to N, which is proportional to the fill factor assuming constant size input subapertures.

Turning now to construction of the flat imager, in the implementation of FIG. 3, the microlenses 320 are supported by a flat substrate 325. In one approach, the microlenses can be manufactured separately and then seated into the substrate 325. Diamond turning and molding are two techniques for manufacturing microlenses.

Figure 4A:
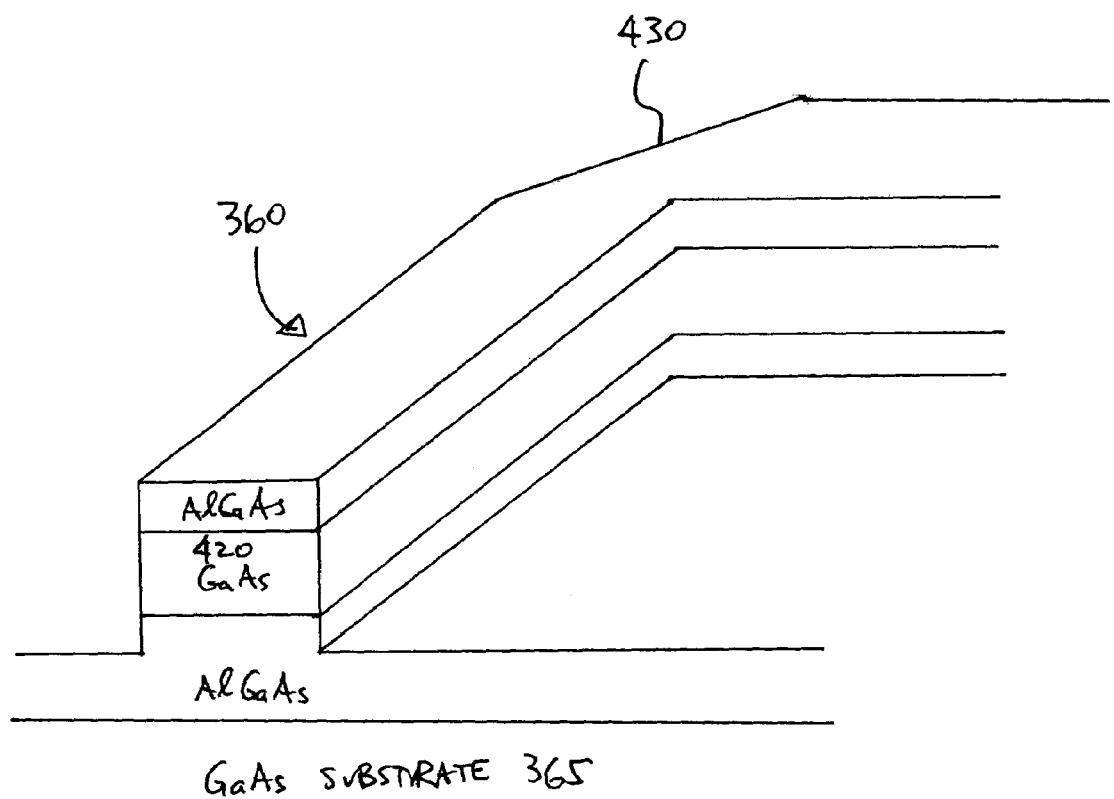
FIGS. 4A–4B are a perspective view and a photomicrograph illustrating various aspects of waveguides.
Figure 4B:
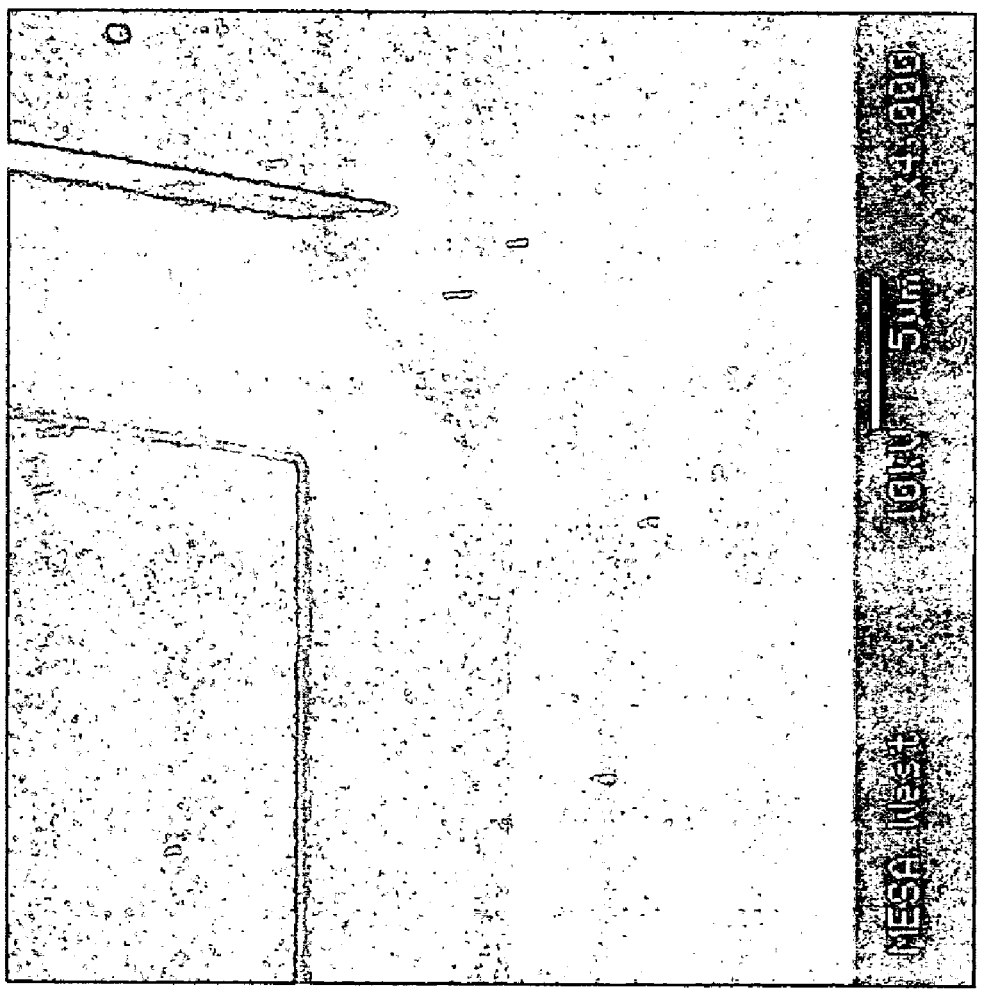
Figure 4C:
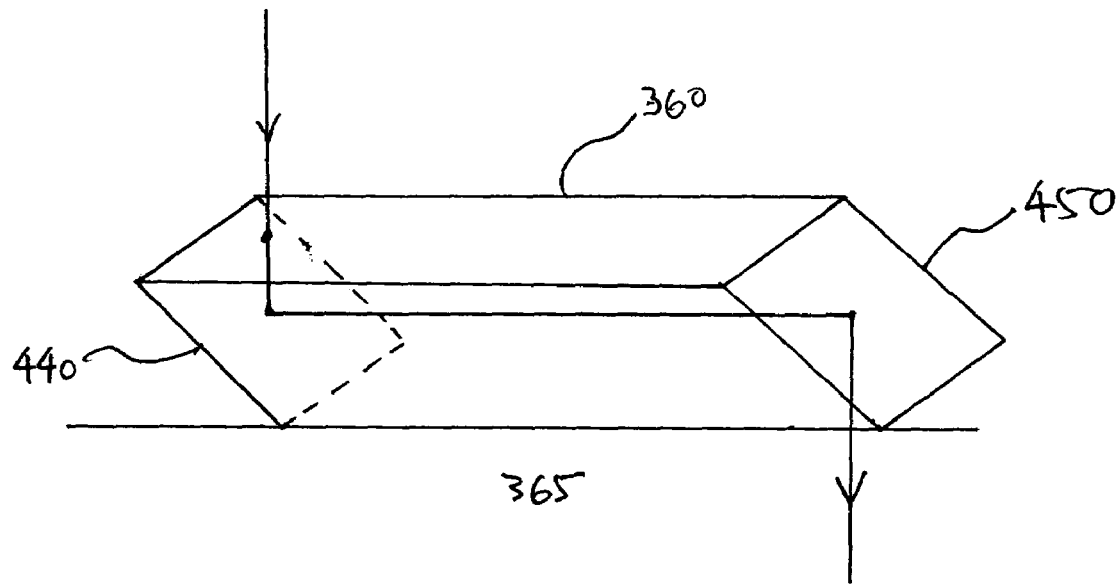
FIGS. 4C–4D are perspective views illustrating additional aspects of waveguides.
Figure 4D:
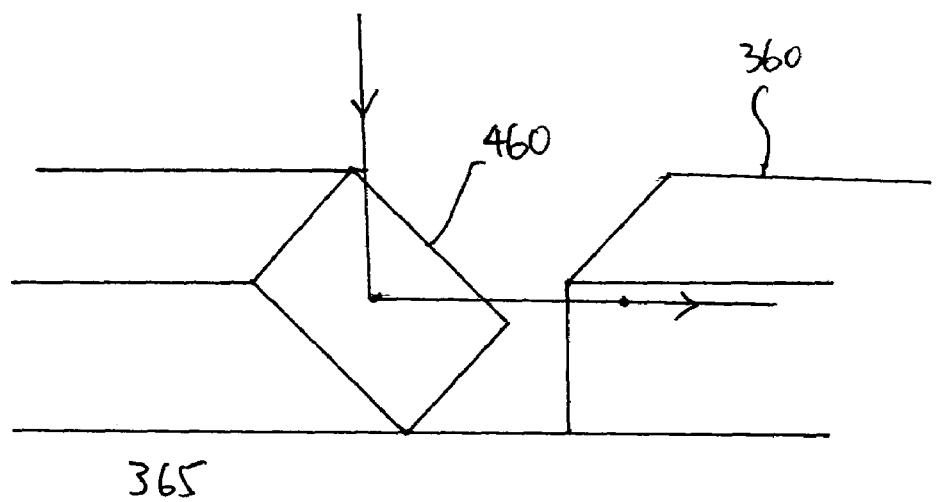
Figure 5:
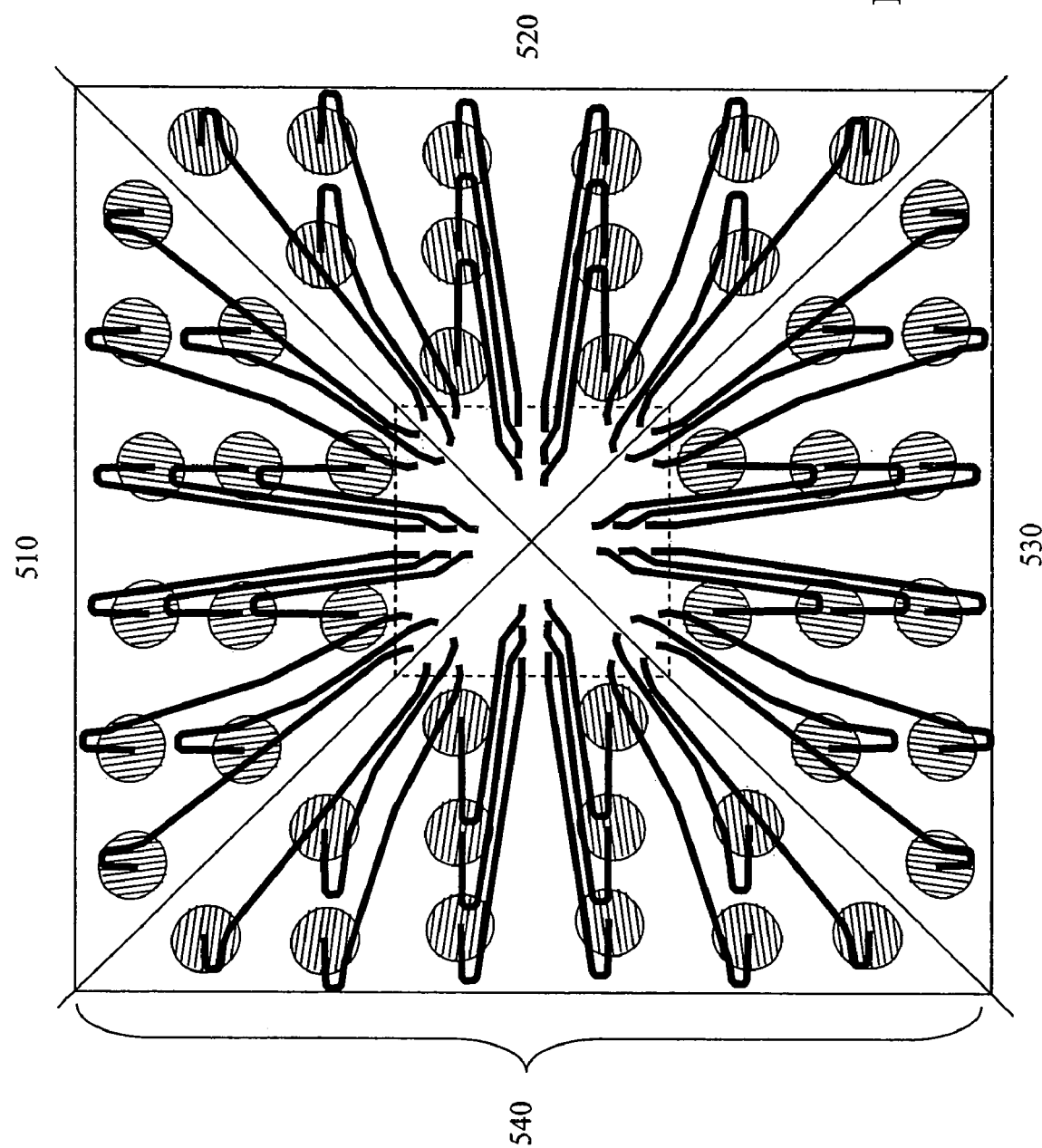
FIG. 5 is a front view of a flat imager illustrating alignment of waveguides for manufacturability.

FIGS. 4–5 illustrate different aspects of fabricating the waveguide array. In this particular example, the waveguides 360 are (Al,Ga) As waveguides integrated onto a GaAs substrate 365 using conventional fabrication techniques. FIG. 4A shows a cross-sectional perspective view of a rectangular waveguide. Layers of AlGaAs, GaAs and AlGaAs are deposited on top of a GaAs substrate. The layers are lithographically patterned and etched to produce the rectangular cross-section. The optical mode is substantially concentrated in the GaAs layer 420. FIG. 4A also shows a turning mirror 430 in the waveguide. These mirrors 430 can be lithographically produced. They rely on total internal reflection to change the direction of propagation within the waveguide. The mirror 430 shown in FIG. 4A makes a right angle turn, but other angles can also be implemented. FIG. 4B is a photomicrograph showing such a waveguide section with turn. Trombone sections in the waveguide can be formed using this type of turning mirror.

FIG. 4C shows a side perspective view of a rectangular waveguide 360, illustrating coupling into and out of the waveguide. The entrance 440 is beveled relative to the substrate 365 surface. Light from the microlens reflects off the beveled face 440 and is coupled into the waveguide. The exit 450 is also beveled. Light within the waveguide reflects off the beveled face and is coupled out of the waveguide towards the output subaperture. In an alternate approach, the exit 450 can be beveled to reflect light in the opposite direction (up, in FIG. 4C). The entrance 440 can also be beveled oppositely to receive light from the opposite direction. FIG. 4D shows an alternate design where light reflects off a separate coupling mirror 460 and into the waveguide 360. A similar approach can be used at the waveguide exit. These types of surfaces can be fabricated using directional ion beam etching and/or chemically assisted ion beam etching, for example.

The basic elements shown in FIGS. 4A–4D can be used to fabricate the waveguide array shown in FIGS. 3A–3B. Depending on the wavelength and accuracy required, standard lithography can meet the manufacturing tolerances required for many applications. In the remaining applications, a number of approaches can be used to fine tune the optical path length of the waveguide. For example, laser trimming may be suitable for slightly changing the width of a waveguide, thereby inducing slight changes in optical path length. Alternately, heating of the waveguide, electro-optic effects (e.g., changing the index of refraction by varying an applied voltage or current) or MEMS (e.g., physically moving small micromirrors in the waveguide optical path) could be used to fine tune the optical path length of the waveguide.

In some cases it may be advantageous to align the different waveguides. For example, referring to FIGS. 4C and 4D, if directional ion beam etching is used to create the beveled surfaces 440 and 450, it would be advantageous to orient these surfaces in the same direction so that a single etching step (or as few etching steps as possible) could create all of the bevels for all of the waveguides. Taking an extreme example, if the entrance for every waveguide was oriented in a different direction, then in a worst case 1000 fabrication steps would be required to fabricate entrances for 1000 waveguides. On the other hand, if the entrances were aligned, then the total number of etching steps can be significantly reduced.

FIGS. 5–6 show an example. In FIG. 5, all of the waveguide entrances in the triangularly shaped quarters 520 and 540 are oriented in the same "east-west" direction (although the entrances in quarter 520 are east facing and those in quarter 540 are west facing). Similarly, the waveguide entrances in quarters 510 and 530 are oriented along the "north-south" direction. Thus, four etching steps, one for each quarter, could be used to create all of the beveled entrances.

Figure 6B:
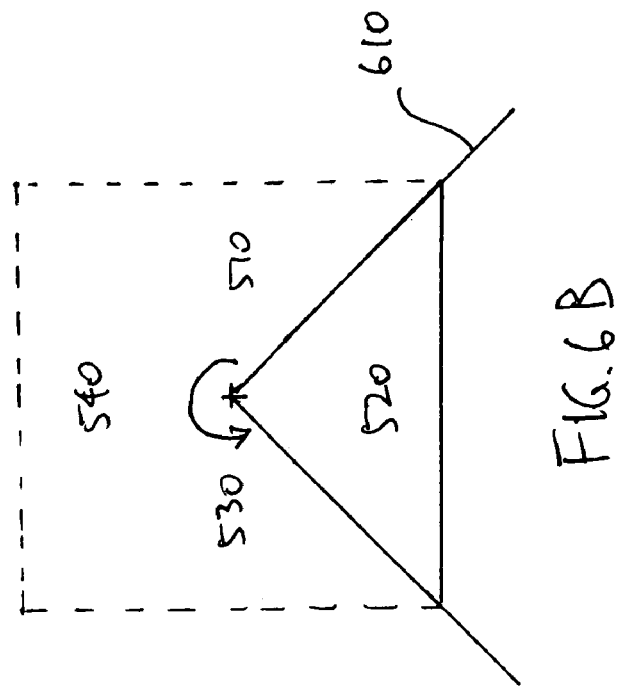
FIGS. 6A–6B are a side view and a front view illustrating manufacture of waveguides.
Figure 6A:
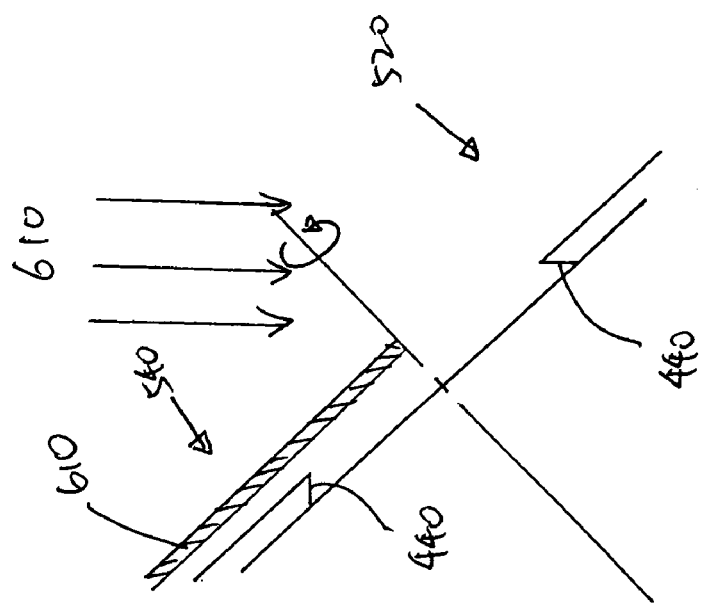

In FIGS. 6A–6B, four etching steps are used but the substrate is not removed from the etching chamber between steps. A mask 610 is located so that it masks quarters 510, 530 and 540 but exposes quarter 520. The directional ion beam is applied and creates the beveled entrances 440 for the waveguides in quarter 520. The substrate is rotated 90 degrees so that the next quarter (e.g., quarter 530) is exposed under the stationary mask 610. The directional ion beam is applied again, creating beveled entrances, which are correctly oriented due to the rotation. This is repeated for the remaining two quarters. If the exits are beveled at the same angle, they may be fabricated at the same time as the entrance bevels. If not, then separate etching steps can be used.

In an alternate approach, the entrances are oriented in a manner that is radially symmetric. For example, the waveguide sections leading up to the entrances may lie along radial "spokes." The substrate rotates continuously at a fixed azimuthal angle. As the ion beam is applied, the entrances are etched at the correct angle with the desired radial symmetry.

Figure 7:
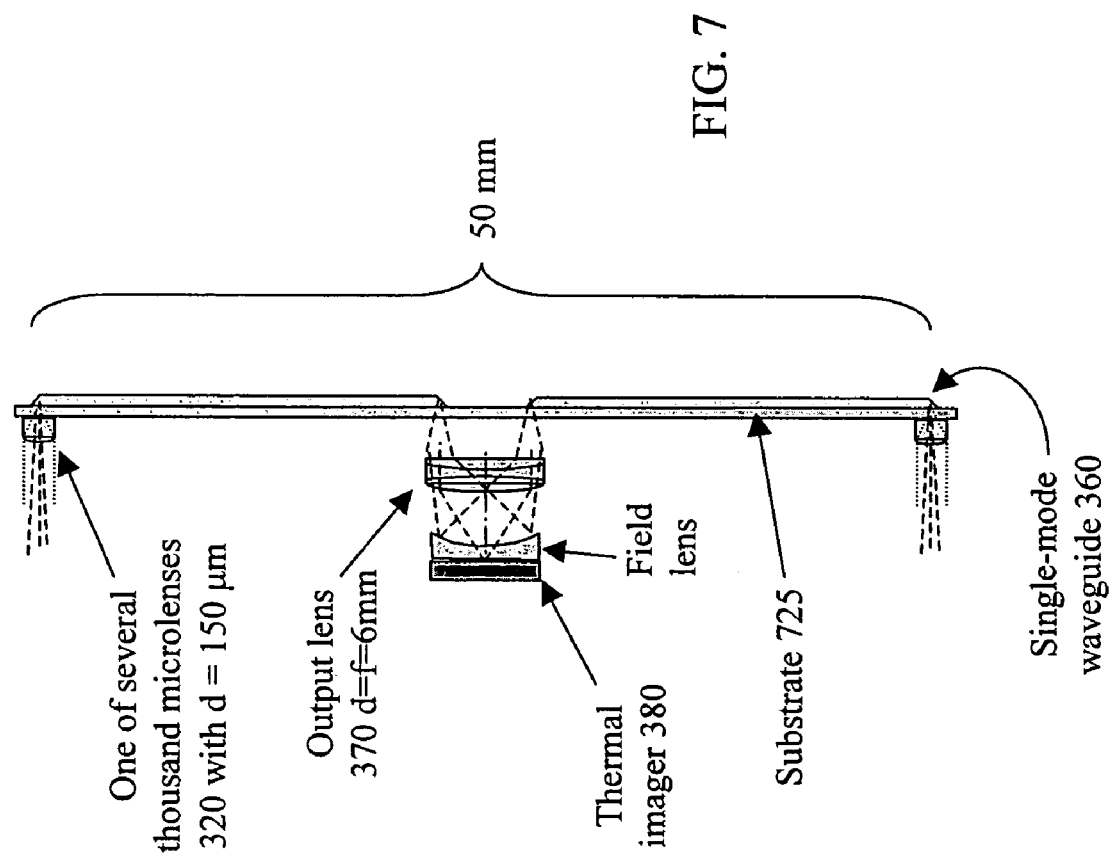
FIG. 7 is a side view of another flat imager.

FIG. 7 is a side view of another flat imager. This imager is similar to the flat imager in FIG. 3, except that a single substrate 725 is used to support the microlenses 320 on one side and the waveguides 360 on the other side. The thickness of the imager is significantly less than the width of the input aperture. Other variations will be apparent. For example, there could be multiple levels of waveguides, analogous to making electrical interconnects using multiple metal layers connected by vias. In one approach, the waveguides on one layer are oriented in the "north-south" direction and waveguides on another layer are oriented in the "east-west" direction. Beveled mirrors are used to couple from one layer to another. The different waveguide levels may be supported by a single substrate or by multiple substrates. In a completely different approach, the optical pathways coupling the subapertures may be free space relay optics, rather than waveguides.

Figure 8:
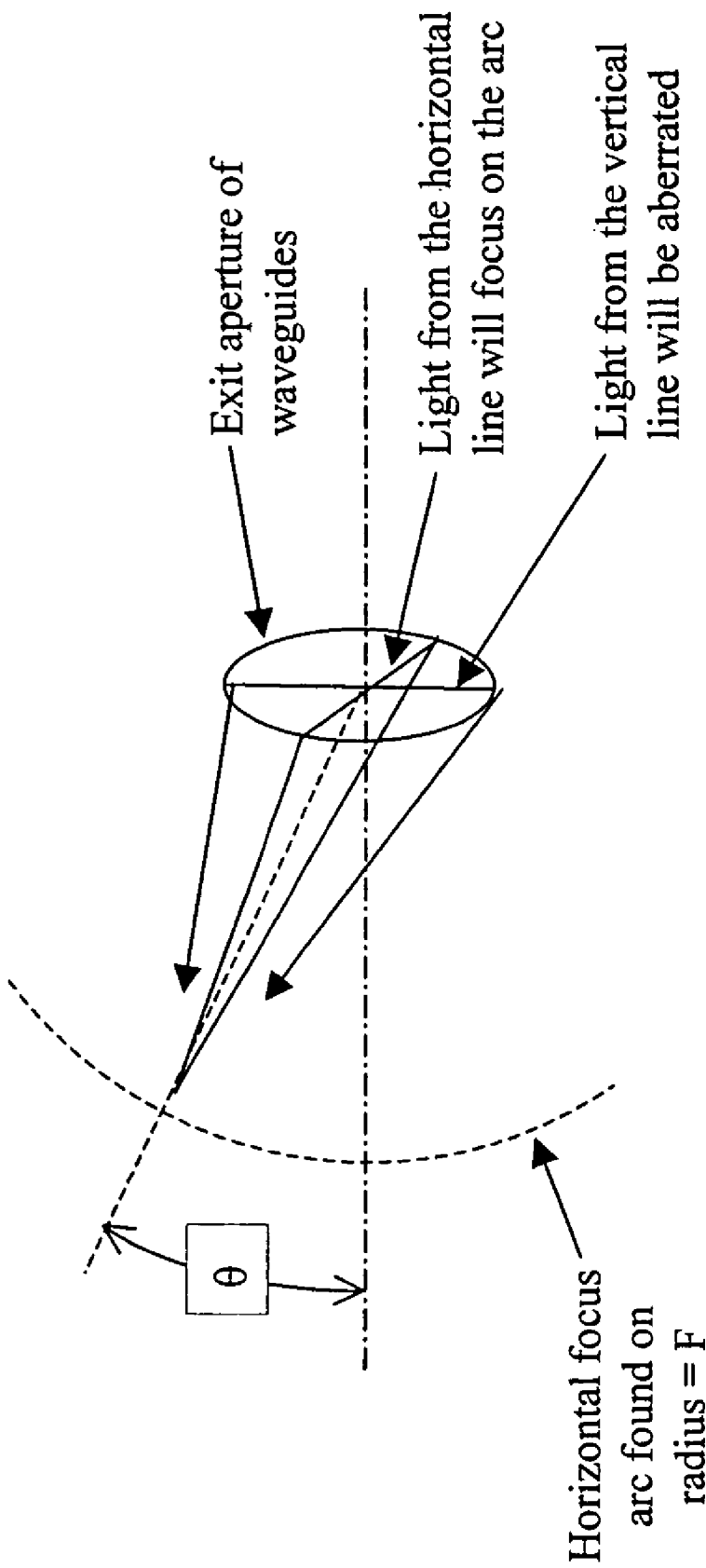
FIG. 8 is a diagram illustrating the aberrations of the waveguides.
Figure 1A:
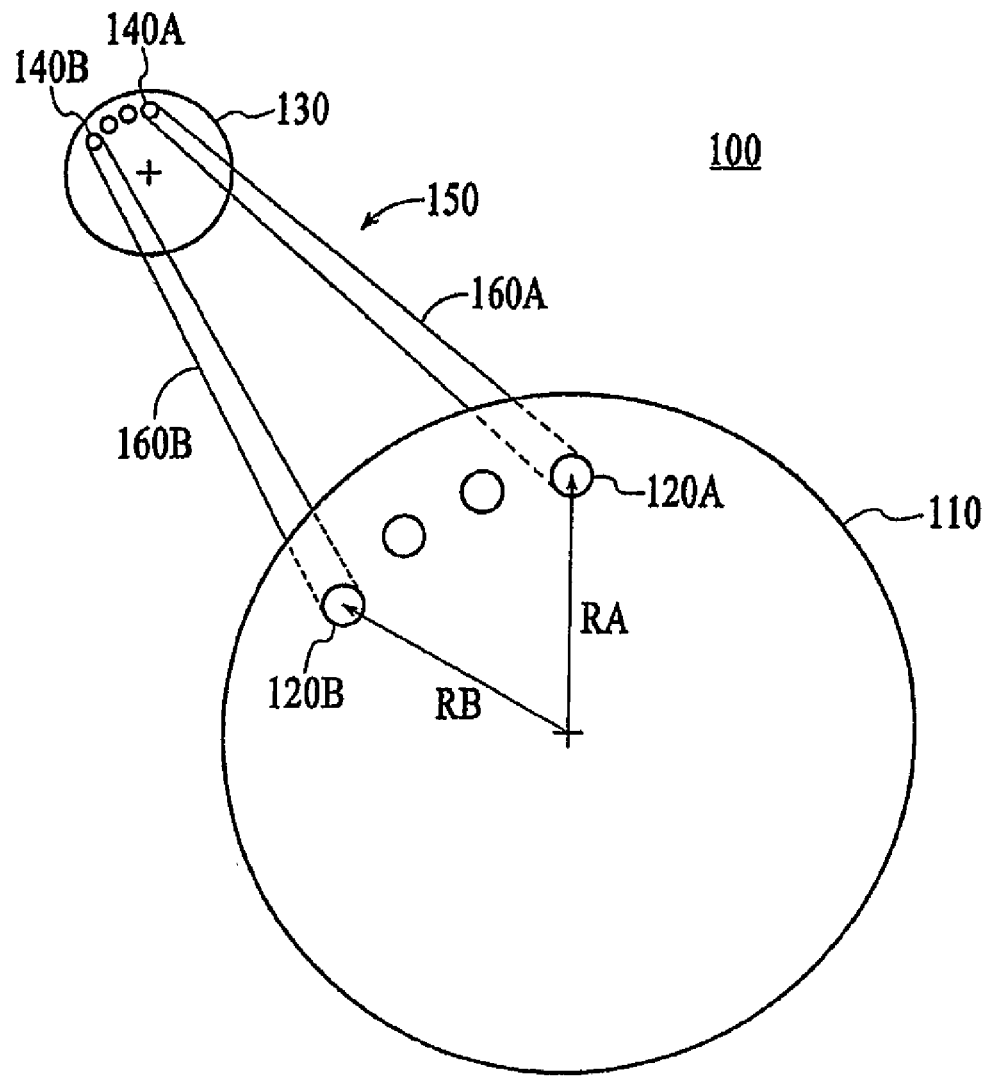
Figure 1B:
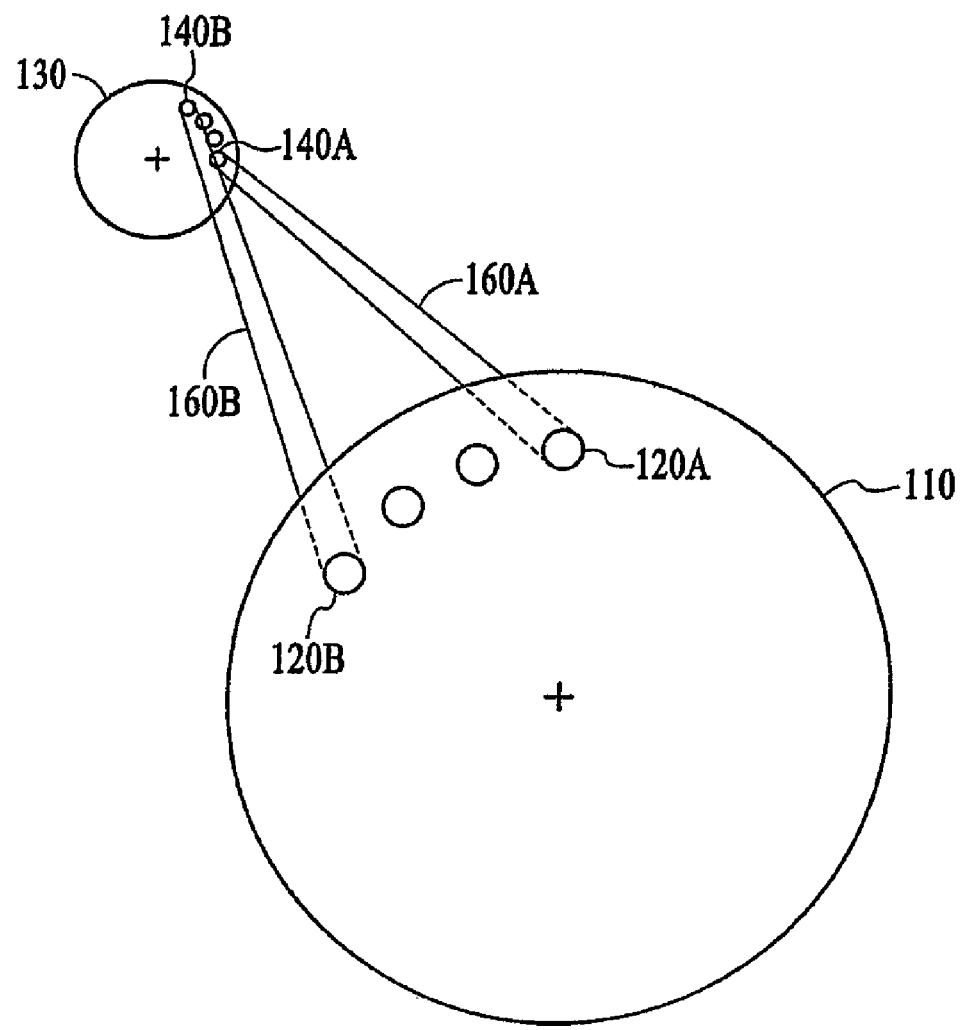
Figure 1C:
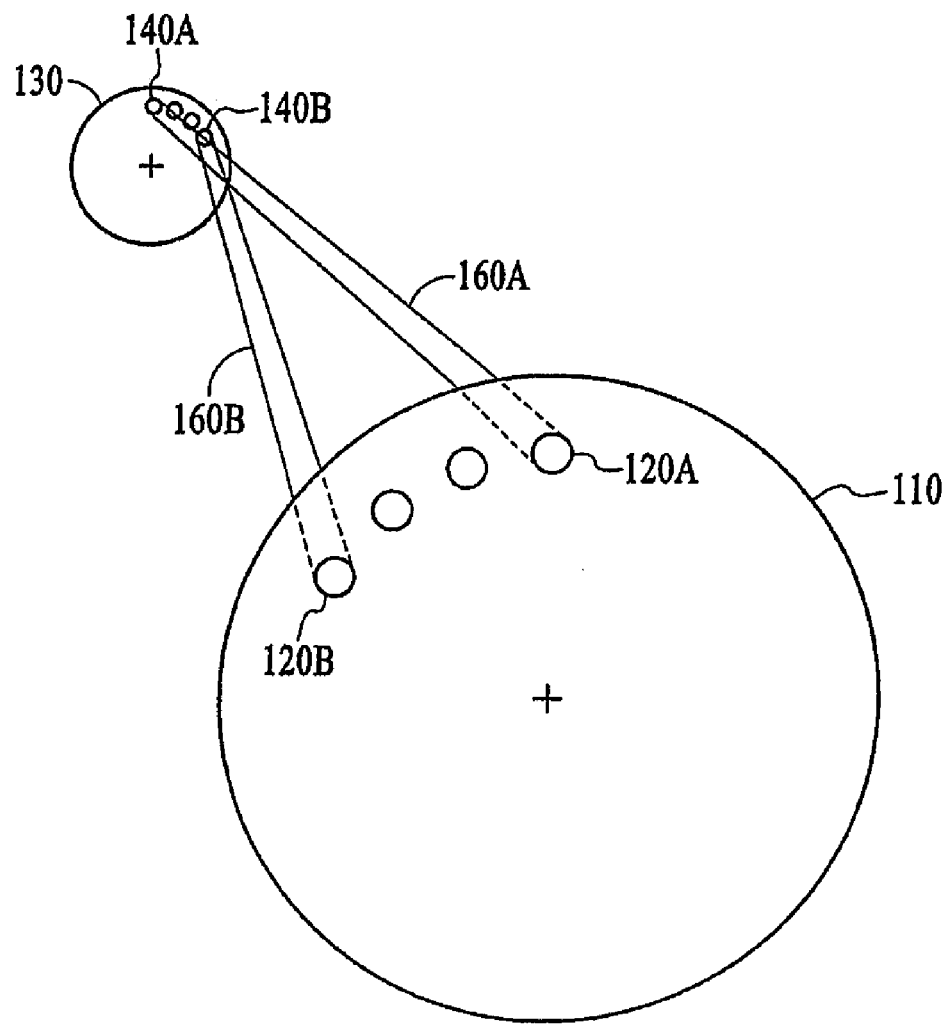
Figure 2:
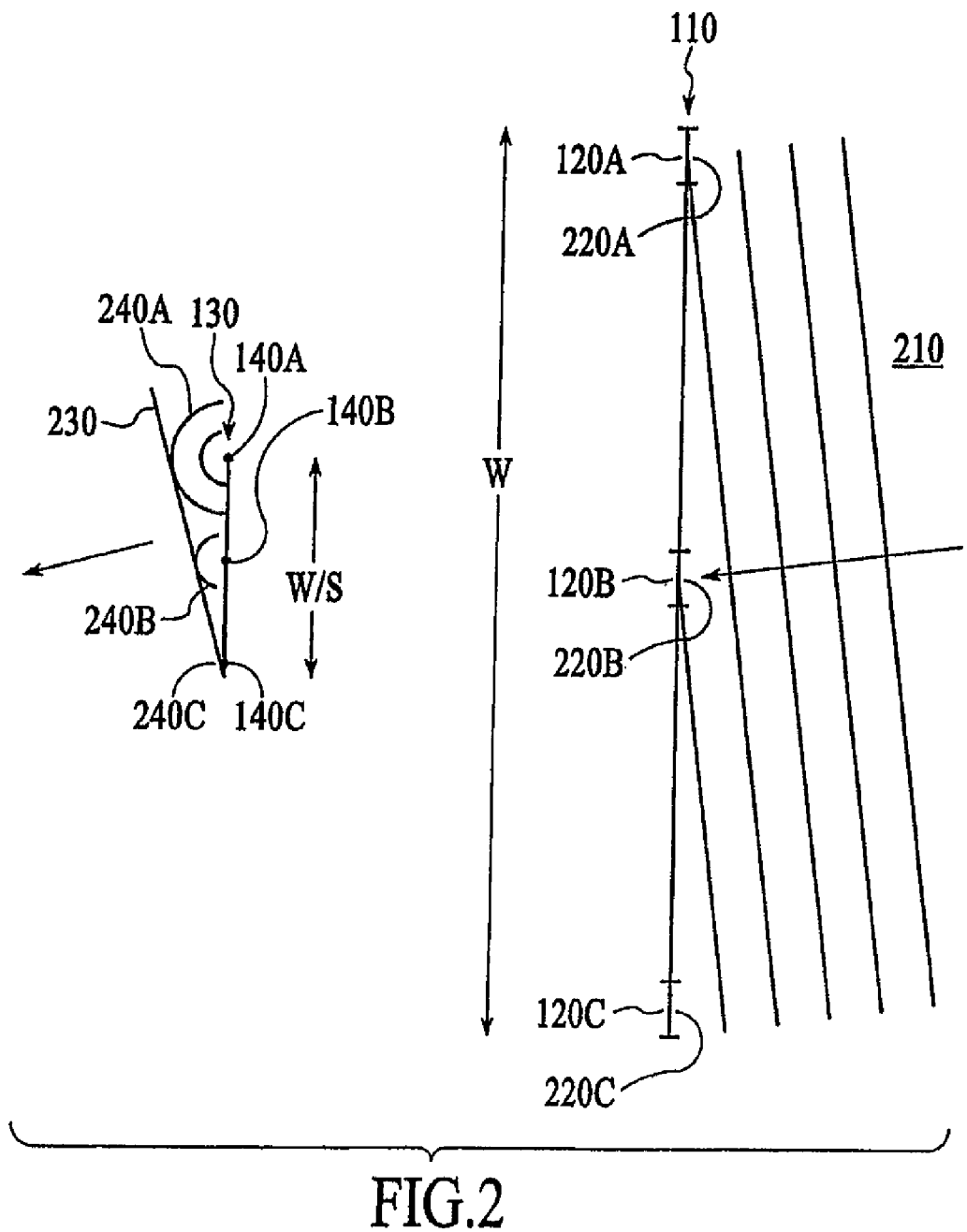
Figure 3A:
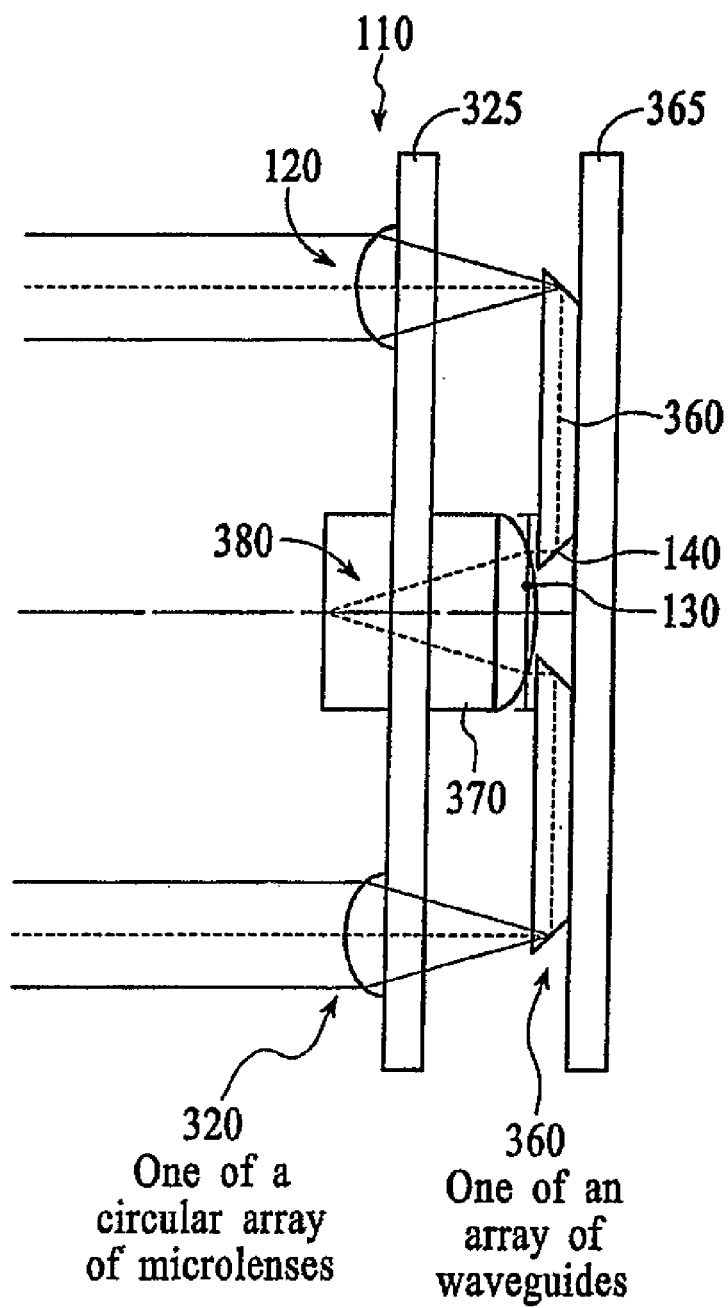
Figure 3B:
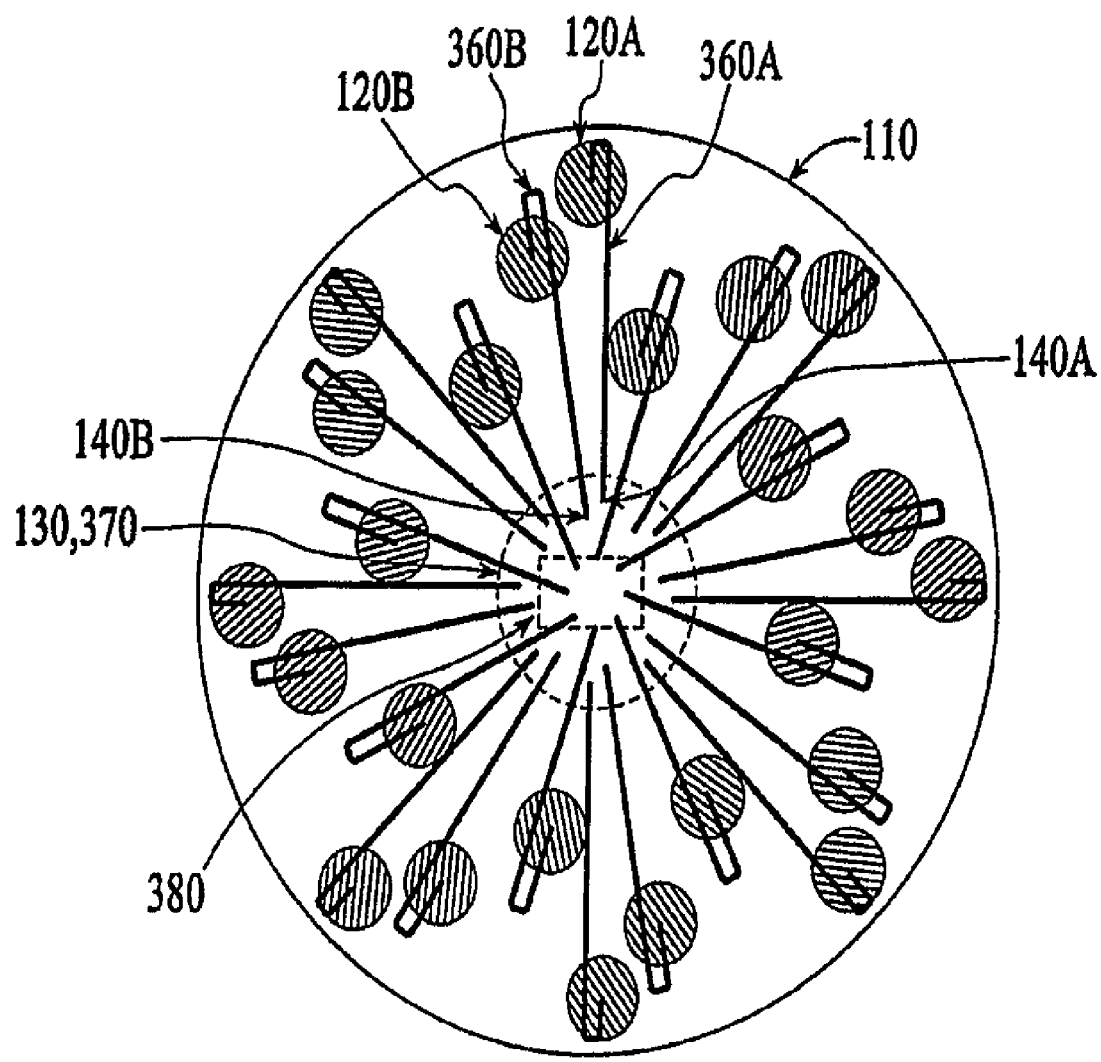
Figure 4A:
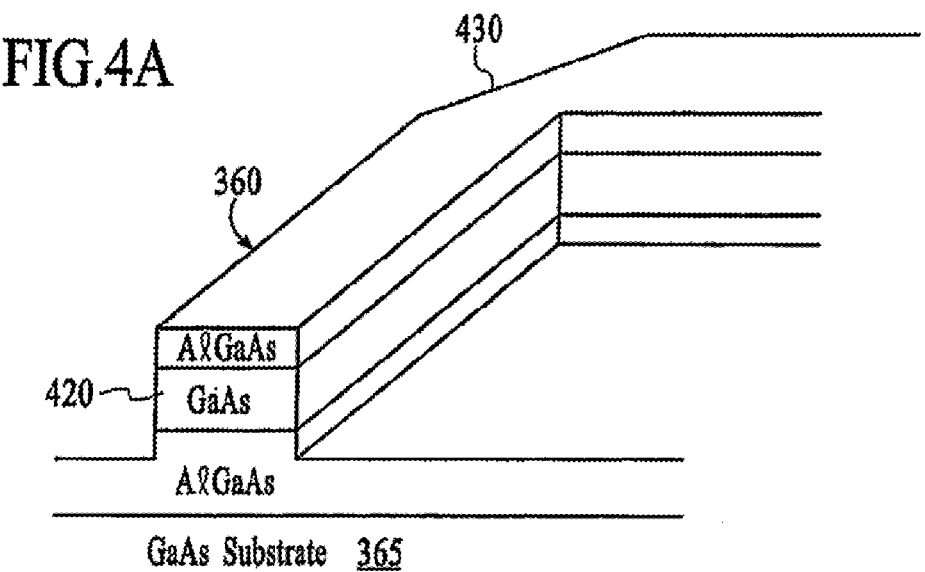
Figure 4B:
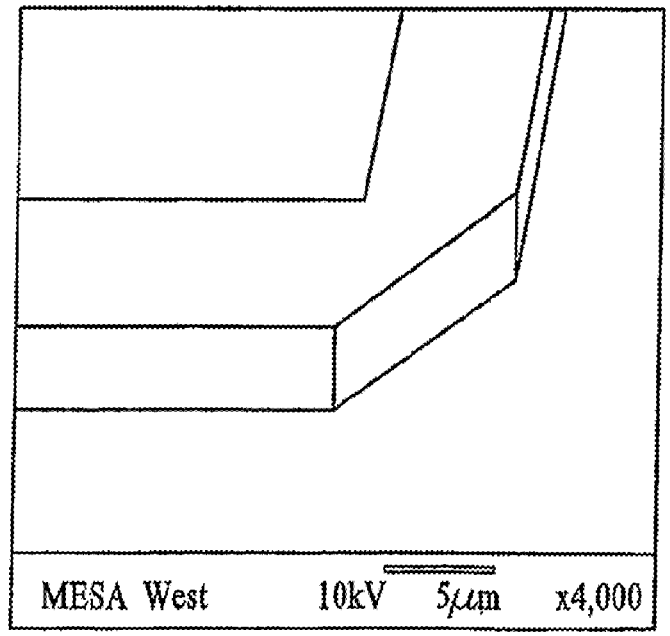
Figure 4C:
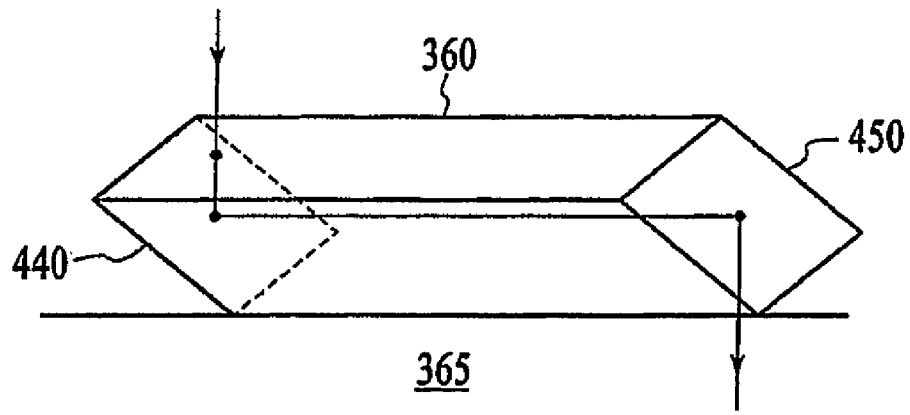
Figure 4D:
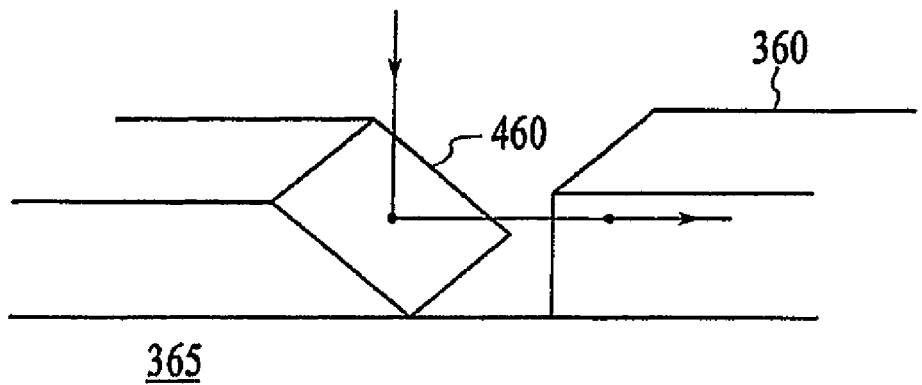
Figure 5:
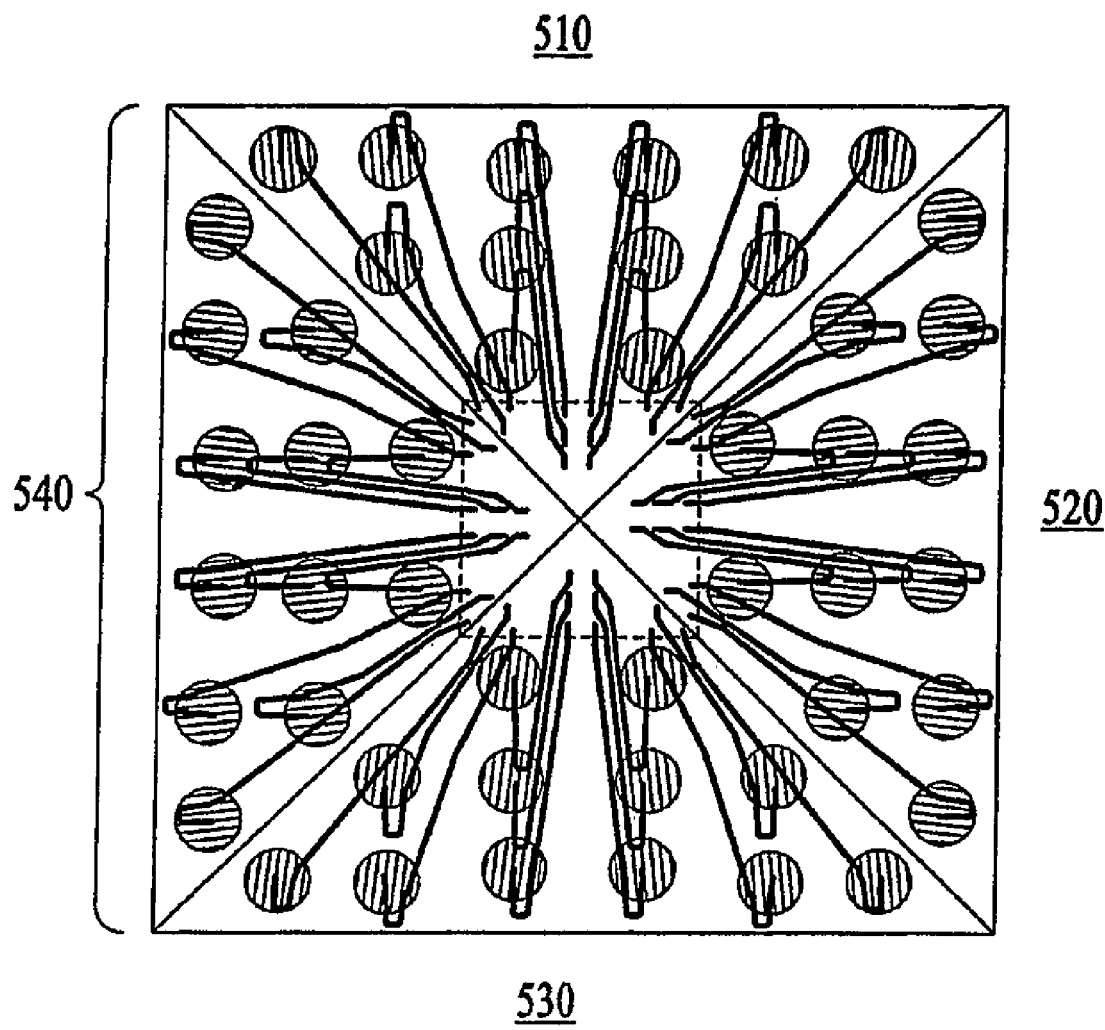
Figure 6B:
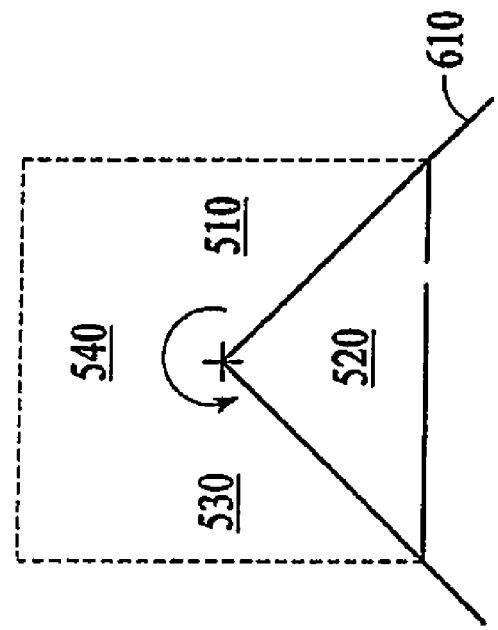
Figure 6A:
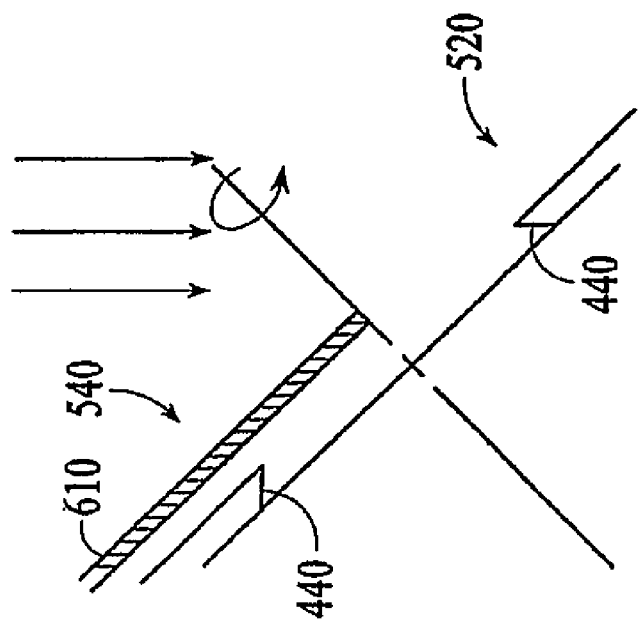
Figure 7:
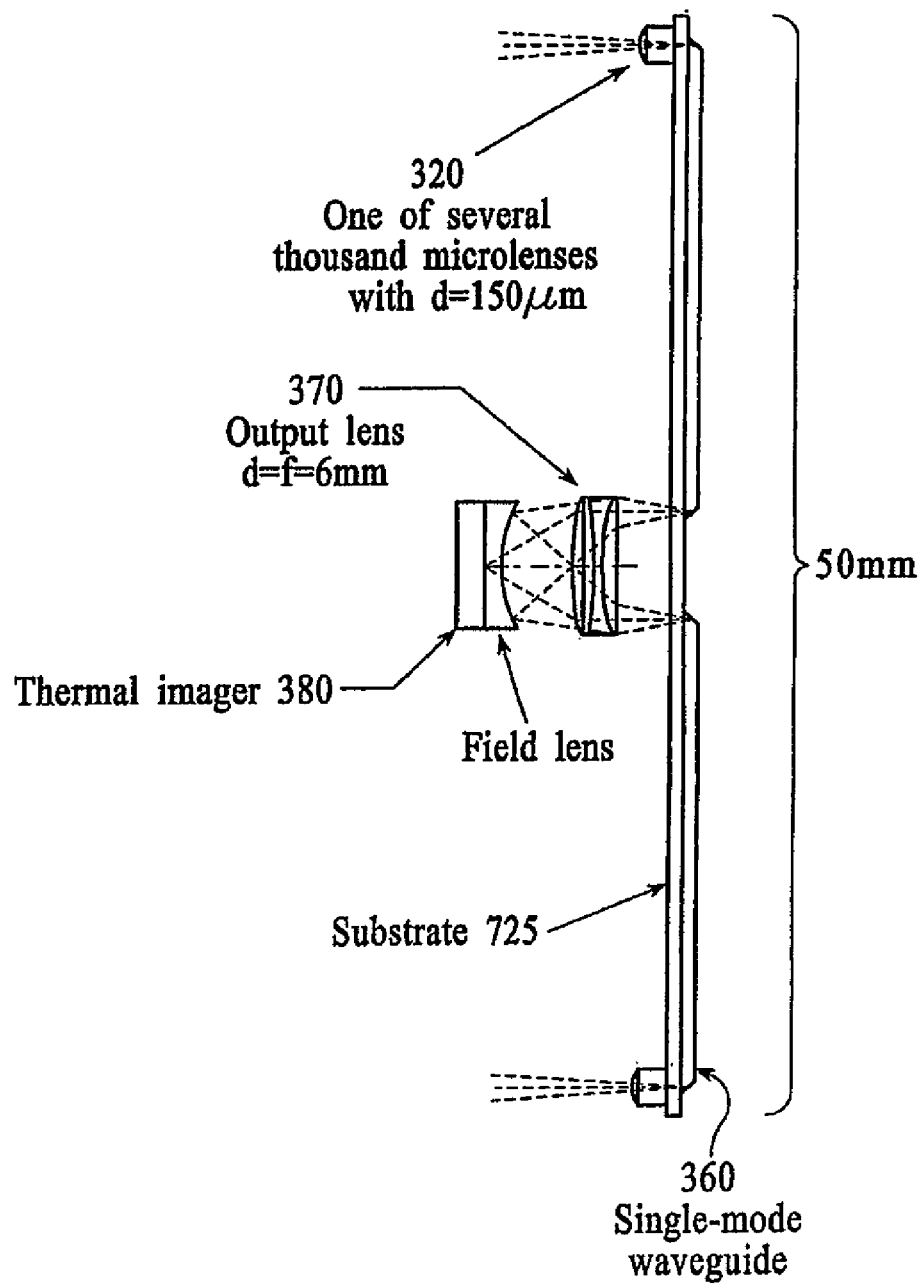
Figure 8:
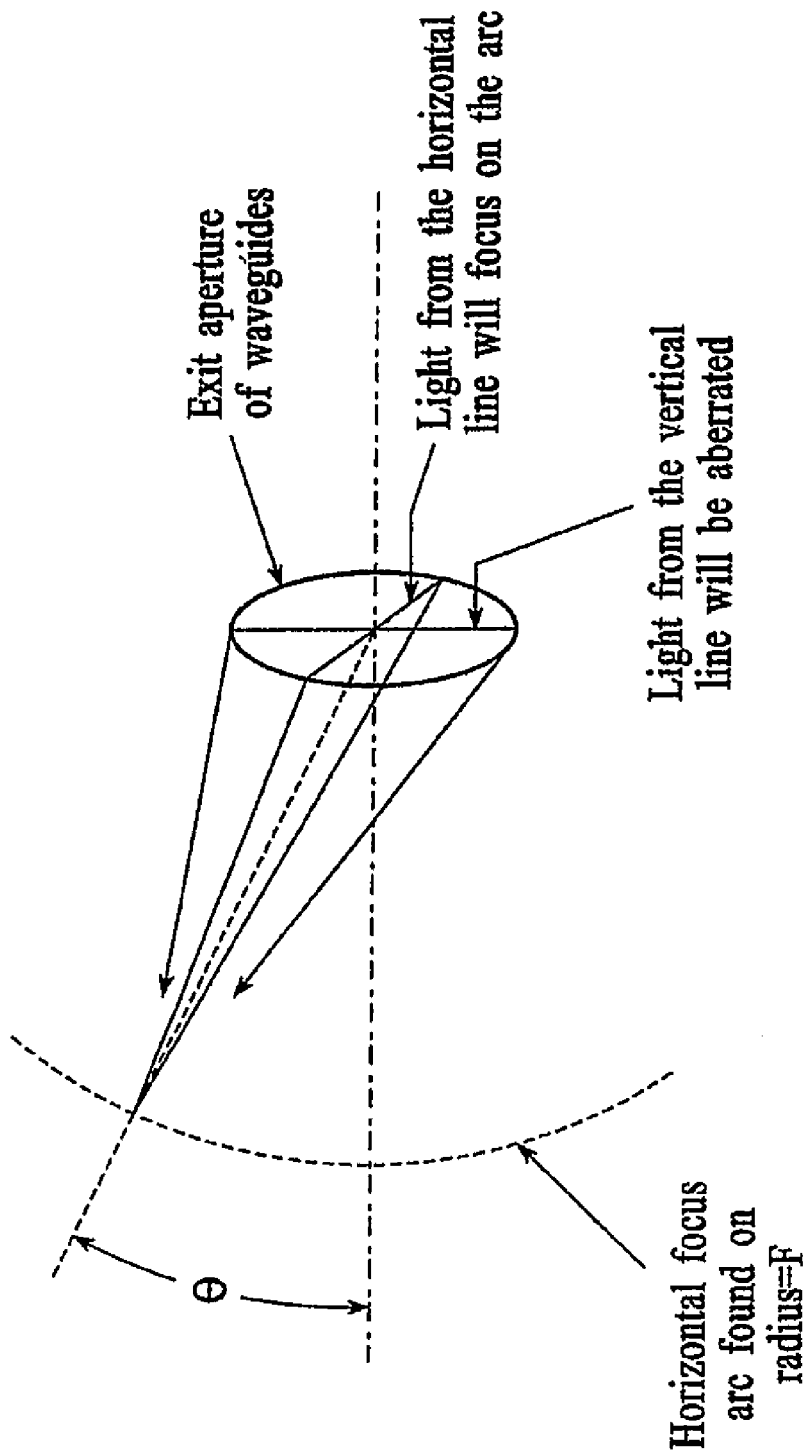

Turning now to the focusing lens 370 of the flat imager, FIG. 8 is a diagram illustrating the aberrations of the waveguides 360, assuming that each waveguide is exactly the same optical path length and ignoring any sampling effects. In this case, the waveguides 360 do not introduce any on-axis aberrations (since all waveguides are exactly the same optical path length) but the off-axis optical path difference is given by $$OPD = OPL(x,y,\theta) - OPL(x,y,0)$$

$$\approx F[y/F \sin\theta + 1/2(y/F \sin\theta)^2 + 1/2(x^2+y^2)y/F^3 \sin\theta - 3/8 (x^2+y^2)^2 y/F^5 \sin\theta)$$

$$-1/2(y/F \sin\theta)^3 - 3/4(x^2+y^2)y^2/F^4 \sin\theta + \ldots \quad (2)$$

where F is the focal length of the focusing lens 370, $\theta$ is the angle of the off-axis object point and (x,y) are the coordinates of the ray within the output aperture. The terms in Eqn. 2 represent the tilt term due to the off-axis object point, third order astigmatism, third order coma, fifth order coma, another fifth order coma-like term, fifth order astigmatism, and so on.

Figure 9A:
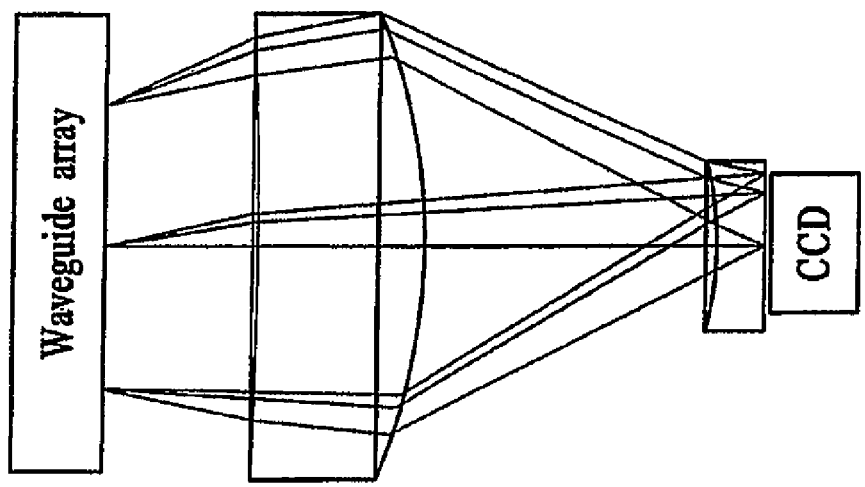
Figure 9C:
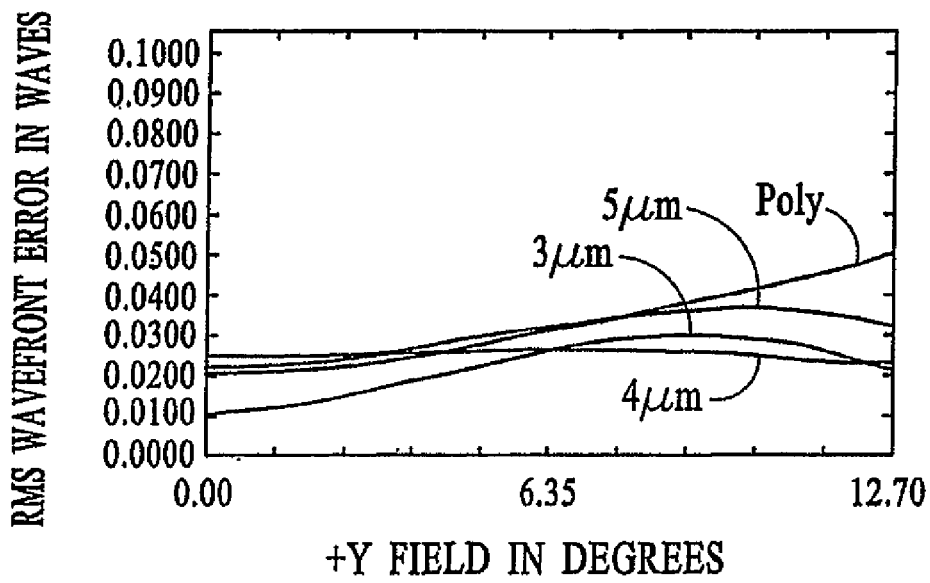

FIGS. 9A–9C are diagrams of a focusing lens designed for use in the 3–5 µm region. FIG. 9A shows a ray trace from the output aperture through the lens to the imager (a CCD device in this example). FIG. 9B gives the prescription for this particular lens. Note that focus and the correction of spherical aberration are built into the waveguide array by altering the paths lengths of different waveguides. FIG. 9C is a graph of the RMS wavefront error as a function of the field.

In this example, the focusing lens was designed to correct aberrations in the overall system. However, the waveguides themselves can also be used to correct aberrations or to intentionally introduce other phase deviations. For example, rather than making all of the waveguides the same optical path length, waveguides could deviate from a nominal optical path length, with the deviation used to correct for aberrations. In one approach, the deviations are a function of the radial location of the output subaperture. In other words, all waveguides that exit at the same radial coordinate will have the same optical path deviation, but the deviation may vary from one radial coordinate to the next. This type of deviation can be used to correct for radially symmetric aberrations. In another variation, the deviations can be used to introduce optical power, thus shifting some or all of the focusing function from focusing lens 370 to the waveguides 360.

"Back ends" other than a focusing lens and detector can also be used. For example, the detector can be replaced by a mirror, in which case the device operates as a retroreflector. If the mirror is modulated, then the device can modulate data onto an interrogating beam.

Finally, the invention is not limited to any particular wavelength. "Light", "optics" and other similar terms are not meant to be limited to just the visible or just the infrared spectrum. They include, but are not limited to visible and shorter wavelengths (such as the ultraviolet) as well as the infrared (including the 3–5 µm and 8–12 µm bands). The invention described above can also be used with millimeter waves (e.g., waveguides could be implemented as wave tubes) and other regions of the electromagnetic spectrum.

What is claimed is:

1. A device for relaying an incoming optical wavefront comprising:
    an input aperture for receiving the wavefront, the input aperture including a plurality of input subapertures for sampling the wavefront at different locations;
    an output aperture including a plurality of output subapertures, each output subaperture located in a same relative position within the output aperture as a corresponding input subaperture is located within the input aperture; and
    a wavefront relay comprising a plurality of optical pathways, each optical pathway optically coupling an input subaperture to the corresponding output subaperture while substantially maintaining a relative phase of the wavefront between subapertures;
    wherein the optical pathways all have substantially a same optical path length; and
    wherein the optical path lengths of the optical pathways deviate from a nominal optical path length and the deviation causes a wavefront from the output aperture to come to a focus; and
    wherein the deviation of an optical pathway is a function of a radial location of the corresponding output subaperture.

2. A device for relaying an incoming optical wavefront comprising:

an input aperture for receiving the wavefront, the input aperture including a plurality of input subapertures for sampling the wavefront at different locations;

an output aperture including a plurality of output subapertures, each output subaperture located in a same relative position within the output aperture as a corresponding input subaperture is located within the input aperture; and a wavefront relay comprising a plurality of optical pathways, each optical pathway optically coupling an input subaperture to the corresponding output subaperture while substantially maintaining a relative phase of the wavefront between subapertures;

wherein the optical pathways all have substantially a same optical path length; and wherein the optical path lengths of the optical pathways deviate from a nominal optical path length and the deviation corrects for aberrations; and wherein the deviation of an optical pathway is a function of the radial location of the corresponding output subaperture.

3. The device of claim 1 wherein a wavelength of the incoming optical wavefront lies within a visible region.

4. The device of claim 1 wherein a wavelength of the incoming optical wavefront lies within an infrared region.

5. The device of claim 4 wherein the wavelength of the incoming optical wavefront is approximately 1.5 µm.

6. The device of claim 4 wherein the wavelength of the incoming optical wavefront lies within the 3–5 µm region.

7. The device of claim 4 wherein the wavelength of the incoming optical wavefront lies within the 8–12 µm region.

8. The device of claim 1 wherein the input subapertures form a regular pattern.

9. The device of claim 8 wherein the input subapertures form a hexagonal pattern.

10. The device of claim 8 wherein the input subapertures form a rectangular pattern.

11. The device of claim 1 wherein the input subapertures form an irregular pattern.

12. The device of claim 1 wherein each optical pathway comprises:
a microlens located in the corresponding input subaperture; and
a waveguide with an entrance located at a focus of the microlens, the microlens coupling a region of the incoming optical wavefront into the waveguide.

13. The device of claim 12 further comprising:
a substrate supporting all of the microlenses.

14. The device of claim 1 wherein each optical pathway comprises:
a waveguide with an entrance and an exit, the entrance laterally located approximately around the corresponding input subaperture and the exit laterally located approximately around the corresponding output subaperture.

15. The device of claim 14 wherein the waveguides are single mode waveguides.

16. The device of claim 14 wherein the waveguides extend primarily in directions parallel to a plane of the input aperture.

17. The device of claim 16 wherein the waveguides include straight sections and the straight sections are oriented in not more than four primary directions.

18. The device of claim 16 wherein the entrances and exits of the waveguides are oriented in not more than four primary directions.

19. The device of claim 16 wherein the entrances and exits of the waveguides are oriented in a radially symmetric manner.

20. The device of claim 16 further comprising:
one or more substrates supporting the waveguides.

21. The device of claim 1 wherein each optical pathway comprises:
a free space optical relay.

22. A device for relaying an incoming optical wavefront comprising:
an input aperture for receiving the wavefront, the input aperture including a plurality of input subapertures for sampling the wavefront at different locations;
an output aperture including a plurality of output subapertures, each output subaperture located in a same relative position within the output aperture as a corresponding input subaperture is located within the input aperture;
microlenses located in the input subapertures;
rectangular waveguides all having substantially a same optical path length, each waveguide with an entrance and an exit, the entrance located at a focus of the corresponding microlens and the exit located approximately around the corresponding output subaperture; and
one or more substrates with the rectangular waveguides integrated on the substrates;
wherein the input aperture, the output aperture and the substrates are parallel; and a separation of the input aperture, the output aperture and the substrates is significantly less than a lateral width of the input aperture.

23. The device of claim 22 further comprising:
a substrate supporting the microlenses.

24. The device of claim 22 wherein one of the substrates with the rectangular waveguides also supports the microlenses.

25. The device of claim 22 wherein the substrate is a GaAs substrate.

26. The device of claim 22 wherein the waveguides are GaAs waveguides.

27. The device of claim 22 wherein the waveguides include trombone sections of varying lengths.

28. The device of claim 22 further comprising:
a mirror for retroreflecting the wavefront produced at the output aperture.

29. The device of claim 22 further comprising:
a modulated mirror for modulating and retroreflecting the wavefront produced at the output aperture.

30. The device of claim 22 further comprising:
a focusing element for forming an image from the wavefront produced at the output aperture; and
a detector for detecting the formed image.

31. The device of claim 30 wherein the optical path lengths of the waveguides deviate from a nominal optical path length and the deviation causes a wavefront from the output aperture to come to focus.

32. The device of claim 31 wherein the deviation in optical pathway is a function of a radial location of the corresponding output subaperture.

33. The device of claim 30 wherein the optical path lengths of the waveguides deviate from a nominal optical path length and the deviation corrects for aberrations.

34. The device of claim 31 wherein the deviation in optical path length for a waveguide is a function of the radial location of the corresponding subaperture.

35. The device of claim 30 wherein the waveguides include straight sections and the straight sections are oriented in not more than four primary directions.

36. The device of claim 35 wherein the entrances and exits of the waveguides are oriented in not more than four primary directions.

37. The device of claim 30 wherein the entrances and exits of the waveguides are oriented in a radially symmetric manner.

38. The device of claim 1 wherein the optical pathways include trombone sections of varying lengths.

39. The device of claim 1 wherein the optical path lengths of the optical pathways deviate from a nominal optical path length and the deviation corrects for aberrations.

40. The device of claim 2 wherein the optical pathways include trombone sections of varying lengths.

41. The device of claim 2 wherein the optical path lengths of the optical pathways deviate from a nominal optical path length and the deviation causes a wavefront from the output aperture to come to a focus.

42. The device of claim 2 wherein a wavelength of the incoming optical wavefront lies within a visible region.

43. The device of claim 2 wherein a wavelength of the incoming optical wavefront lies within an infrared region.

44. The device of claim 43 wherein the wavelength of the incoming optical wavefront is approximately 1.5 µm.

45. The device of claim 43 wherein the wavelength of the incoming optical wavefront lies within the 3–5 µm region.

46. The device of claim 43 wherein the wavelength of the incoming optical wavefront lies within the 8–12 µm region.

47. The device of claim 2 wherein the input subapertures form a regular pattern.

48. The device of claim 47 wherein the input subapertures form a hexagonal pattern.

49. The device of claim 47 wherein the input subapertures form a rectangular pattern.

50. The device of claim 2 wherein the input subapertures form an irregular pattern.

51. The device of claim 2 wherein each optical pathway comprises:
a microlens located in the corresponding input subaperture; and
a waveguide with an entrance located at a focus of the microlens, the microlens coupling a region of the incoming optical wavefront into the waveguide.

52. The device of claim 51 further comprising:
a substrate supporting all of the microlenses.

53. The device of claim 2 wherein each optical pathway comprises:
a waveguide with an entrance and an exit, the entrance laterally located approximately around the corresponding input subaperture and the exit laterally located approximately around the corresponding output subaperture.

54. The device of claim 53 wherein the waveguides are single mode waveguides.

55. The device of claim 53 wherein the waveguides extend primarily in directions parallel to a plane of the input aperture.

56. The device of claim 55 wherein the waveguides include straight sections and the straight sections are oriented in not more than four primary directions.

57. The device of claim 55 wherein the entrances and exits of the waveguides are oriented in not more than four primary directions.

58. The device of claim 55 wherein the entrances and exits of the waveguides are oriented in a radially symmetric manner.

59. The device of claim 55 further comprising:
one or more substrates supporting the waveguides.

60. The device of claim 2 wherein each optical pathway comprises:
a free space optical relay.

* * * * *

UNITED STATES PATENT AND TRADEMARK OFFICE
CERTIFICATE OF CORRECTION

| | |
|---|---|
| PATENT NO. | : 7,187,815 B1 |
| APPLICATION NO. | : 10/956733 |
| DATED | : March 6, 2007 |
| INVENTOR(S) | : Sweatt et al. |

It is certified that error appears in the above-identified patent and that said Letters Patent is hereby corrected as shown below:

The title page showing the illustrative figure should be deleted to be replaced with the attached title page.

The drawing sheets 1-14, consisting of Figs. 1A-9B, should be deleted to replaced with drawing sheet, consisting of Figs. 1A-9B, as shown on the attached page.

Signed and Sealed this

Twenty-fourth Day of April, 2007

JON W. DUDAS
*Director of the United States Patent and Trademark Office*

United States Patent
Sweatt et al.

(10) Patent No.: US 7,187,815 B1
(45) Date of Patent: Mar. 6, 2007

(54) RELAYING AN OPTICAL WAVEFRONT

(75) Inventors: William C. Sweatt, Albuquerque, NM (US); G. Allen Vawter, Corrales, NM (US)

(73) Assignee: Sandia Corporation, Albuquerque, NM (US)

(*) Notice: Subject to any disclaimer, the term of this patent is extended or adjusted under 35 U.S.C. 154(b) by 272 days.

(21) Appl. No.: 10/956,733

(22) Filed: Oct. 1, 2004

(51) Int. Cl.
G02B 6/00 (2006.01)
(52) U.S. Cl. .................................. 385/12; 250/201.9
(58) Field of Classification Search ................ 356/121; 385/3, 16, 42
See application file for complete search history.

(56) References Cited

U.S. PATENT DOCUMENTS

| | | | | |
|---|---|---|---|---|
| 4,798,437 A | * | 1/1989 | Rediker et al. | 385/3 |
| 5,493,391 A | * | 2/1995 | Neal et al. | 356/121 |
| 5,912,731 A | * | 6/1999 | DeLong et al. | 356/121 |
| 5,926,589 A | * | 7/1999 | Gaeta | 385/16 |
| 6,184,974 B1 | * | 2/2001 | Neal et al. | 356/121 |
| 6,785,447 B2 | * | 8/2004 | Yoshimura et al. | 385/42 |

* cited by examiner

Primary Examiner—Frank G. Font
Assistant Examiner—Guy G. Anderson
(74) Attorney, Agent, or Firm—Fenwick & West LLP; Kevin W. Bieg

(57) ABSTRACT

A wavefront relay devices samples an incoming optical wavefront at different locations, optically relays the samples while maintaining the relative position of the samples and the relative phase between the samples. The wavefront is reconstructed due to interference of the samples. Devices can be designed for many different wavelengths, including for example the ultraviolet, visible, infrared and even longer wavelengths such as millimeter waves. In one application, the device function as a telescope but with negligible length.

60 Claims, 14 Drawing Sheets

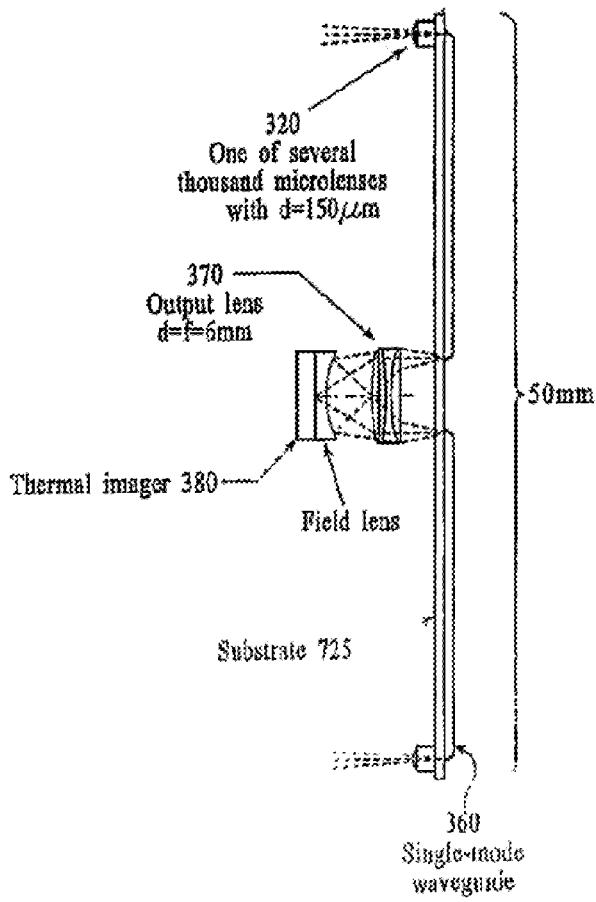

System/Prescription Data

| Surf | Type | Comment | Radius | Thickness | Glass | Diameter |
|---|---|---|---|---|---|---|
| OBJ | STANDARD | | Infinity | Infinity | | 0 |
| STO | EVENASPH | | Infinity | 0 | | 3.619464 |
| 2 | STANDARD | | Infinity | 1.871277 | GAAS | 3.619574 |
| 3 | STANDARD | | -40.15953 | 2 | | 5.305777 |
| 4 | STANDARD | | -7.690542 | 3.6 | SILICON | 5.839923 |
| 5 | STANDARD | | -4.791744 | 0.6 | LIF | 2.155744 |
| 6 | STANDARD | | Infinity | 0.06 | | 1.788506 |
| IMA | STANDARD | | Infinity | | | 1.764447 |

SURFACE DATA DETAIL

Assume focus and spherical aberration built into waveguide array

Surface STO : EVENASPH
Coeff on r 2 : -0.0036812032
Coeff on r 4 : -0.0017568513
Coeff on r 6 : -0.00034966385

Wavelengths, 3, 4, and 5 microns
FOV = 12.7 degrees

FIG. 9B